(12) United States Patent
Zacks et al.

(10) Patent No.: US 12,192,096 B2
(45) Date of Patent: Jan. 7, 2025

(54) PERFORMANCE TRACING FOR MOBILE NETWORK ENVIRONMENTS

(71) Applicant: Cisco Technology, Inc., San Jose, CA (US)

(72) Inventors: David John Zacks, Vancouver (CA); Flemming Stig Andreasen, Marlboro, NJ (US); Robert Edgar Barton, Richmond (CA); Timothy Peter Stammers, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/323,134

(22) Filed: May 24, 2023

(65) Prior Publication Data

US 2024/0396829 A1    Nov. 28, 2024

(51) Int. Cl.
*H04L 45/00* (2022.01)
*H04L 43/10* (2022.01)

(52) U.S. Cl.
CPC .............. *H04L 45/26* (2013.01); *H04L 43/10* (2013.01)

(58) Field of Classification Search
None
See application file for complete search history.

(56) References Cited

U.S. PATENT DOCUMENTS

| 10,284,460 | B1 | 5/2019 | Bshara et al. | |
| 10,412,625 | B1* | 9/2019 | Yan | H04L 47/125 |
| 10,554,701 | B1* | 2/2020 | Decker | G06F 21/55 |
| 10,567,245 | B1 | 2/2020 | Patil et al. | |
| 11,234,163 | B1* | 1/2022 | Ho | H04W 28/06 |
| 2014/0119196 | A1* | 5/2014 | Hui | H04L 41/065 370/241 |
| 2015/0019746 | A1 | 1/2015 | Shatzkamer et al. | |

(Continued)

OTHER PUBLICATIONS

3GPP, 5G, ETSI TS 132 423 V17.6.0, "Digital cellular telecommunications system (Phase 2+) (GSM); Universal Mobile Telecommunications System (UMTS); LTE; Telecommunication management; Subscriber and equipment trace; Trace data definition and management," Technical Specification, TS 32.423 version 17.6.0 Release 17, Jan. 2023, 122 pages.

(Continued)

*Primary Examiner* — Kamal M Hossain
(74) *Attorney, Agent, or Firm* — Edell, Shapiro & Finnan, LLC

(57) ABSTRACT

Provided herein are techniques to facilitate multi-level performance tracing for a mobile network environment. In one instance, a method may include obtaining, by a mobile network, a trigger from an enterprise to initiate an underlay-level trace for a wireless device of the enterprise, wherein the trigger includes a correlation identifier that correlates the underlay-level trace with an enterprise-level trace for the wireless device and providing the underlay-level trace for a session of the wireless device by including a first trace flag for IP packets for the session and including a second trace flag for encapsulations of the IP packets for the session in which the first and second trace flag are unique to the session of the wireless device and enable elements of the mobile network to provide underlay trace information for the underlay-level trace for the session of the wireless device to a trace.

20 Claims, 7 Drawing Sheets

(56) References Cited

U.S. PATENT DOCUMENTS

| | | |
|---|---|---|
| 2020/0022020 A1 | 1/2020 | Yan et al. |
| 2020/0076724 A1 | 3/2020 | Nainar et al. |
| 2022/0131759 A1 | 4/2022 | Boon |
| 2022/0174011 A1 | 6/2022 | Filsfils et al. |
| 2022/0407800 A1 | 12/2022 | Chadha |
| 2024/0031268 A1* | 1/2024 | Gu .................... H04L 43/10 |

OTHER PUBLICATIONS

3GPP, 5G, ETSI TS 132 421 V17.4.0, "Digital cellular telecommunications system (Phase 2+) (GSM); Universal Mobile Telecommunications System (UMTS); LTE; Telecommunication management; Subscriber and equipment trace; Trace concepts and requirements," Technical Specification, 32.421 version 17.4.0 Release 17, Oct. 2022, 52 pages.

Ericsson AB, Huawei Technologies Co. Ltd, NEC Corporation, Alcatel Lucent, and Nokia Networks, "Common Public Radio Interface (CPRI); Interface Specification," CPRI Specification V7.0, Oct. 2015, 128 pages.

Ericsson AB, Huawei Technologies Co. Ltd, NEC Corporation and Nokia, "Common Public Radio Interface: eCPRI Interface Specification," eCPRI Specification V2.0, May 2019, 109 pages.

3GPP, 5G, ETSI TS 132 422 V17.10.0, "Digital cellular telecommunications system (Phase 2+) (GSM); Universal Mobile Telecommunications System (UMTS); LTE; Telecommunication management; Subscriber and equipment trace; Trace control and configuration management," Technical Specification, 32.422 version 17.10.0 Release 17, Apr. 2023, 229 pages.

3GPP, 5G, ETSI TS 123 501 V17.8.0, "5G, System Architecture for the 5G System (5GS)", 3GPP TS 23.501 Version 17.8.0 Release 17, Apr. 2023, 575 Pages.

3GPP, 5G, ETSI TS 123 502 V17.8.0, "5G, Procedures for the 5G System (5GS)", 3GPP TS 23.502 Version 17.8.0 Release 17, Apr. 2023, 752 Pages.

3GPP, 5G, ETSI TS 129 244 V17.4.0, "LTE, SG, Interface Between the Control Plane and the User Plane Nodes", 3GPP TS 29.244 Version 17.4.0 Release 17, May 2022, 376 Pages.

3GPP, 5G, ETSI TS 138 413 V17.4.0, "5G, NG-RAN, NG Application Protocol (NGAP)", 3GPP TS 38.413 Version 17.4.0 Release 17, May 2023, 572 Pages.

* cited by examiner

PERFORMANCE TRACING FOR MOBILE NETWORK ENVIRONMENTS

TECHNICAL FIELD

The present disclosure relates to network equipment and services.

BACKGROUND

Networking architectures have grown increasingly complex in communication environments. In particular, mobile communication networks have grown substantially as end users become increasingly connected to mobile network environments. As the number of mobile users increases, efficient management of communication resources and of users becomes more critical.

DETAILED DESCRIPTION

Overview

Figure 1A:
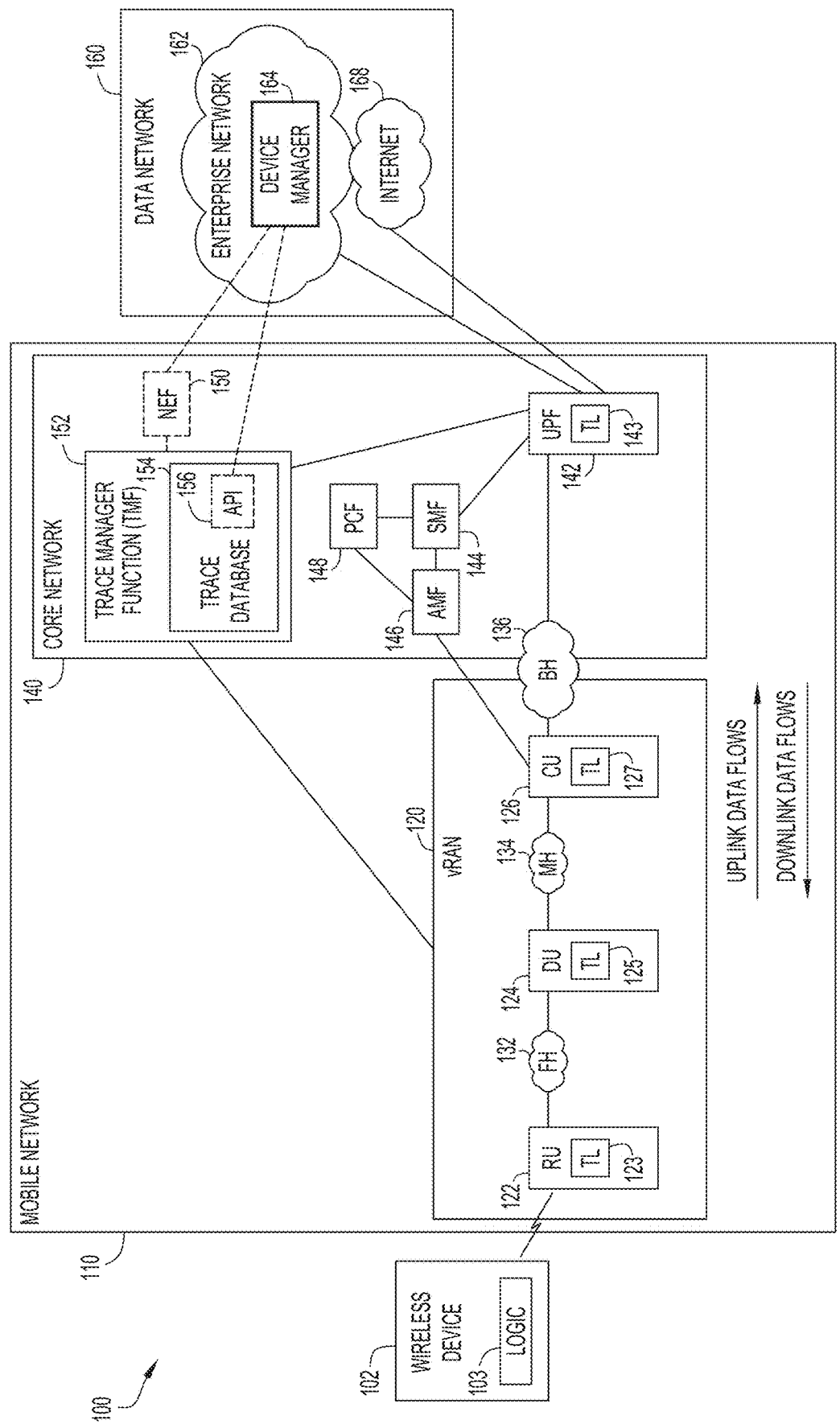
FIG. 1A is a block diagram of a system that may facilitate performance tracing for a mobile network environment, according to an example embodiment.

Provided herein are techniques through which multi-layer performance tracing can be provided for a mobile network environment. The terms 'multi-layer' and 'multi-level' may be used interchangeably herein. In at least one embodiment, a computer-implemented method is provided that may include obtaining, by a mobile network, a trigger from an enterprise to initiate an underlay-level trace for a wireless device of the enterprise, wherein the trigger includes a correlation identifier that correlates the underlay-level trace with an enterprise-level trace for the wireless device; and providing, by the mobile network, the underlay-level trace for a session of the wireless device by including a first trace flag for Internet Protocol (IP) packets for the session of the wireless device and including a second trace flag for encapsulations of the IP packets for the session of the wireless device wherein the first trace flag and the second trace flag are unique to the session of the wireless device and are to enable network elements of the mobile network to provide underlay trace information for the underlay-level trace for the session of the wireless device to a trace database within the mobile network, wherein the underlay trace information is stored in the trace database in association with the correlation identifier and session identifying information for the session of the wireless device.

EXAMPLE EMBODIMENTS

Path tracing and performance monitoring in an Internet Protocol (IP) network are traditionally performed in a hop-by-hop manner at the IP level. In a mobile core network, such as any combination of a Third Generation Partnership Project (3GPP) Fourth Generation/Long Term Evolution (4G/LTE), Fifth Generation (5G), and/or next Generation (nG) mobile network, an IP session for a wireless device, often referred to as a user equipment (UE), is established with a user plane function (UPF) of the mobile network that handles, hosts, or otherwise facilitates downlink (to the UE) and uplink (from the UE) data flows for the IP session of the UE.

However, there can be other mobile network elements, protocols, and transport underlay transport elements in addition to radio bearers established between the UE and a radio access network (RAN) that are involved in the communication of the uplink (UL)/downlink (DL) data flows for the IP session of the UE. Such mobile network elements can include, in addition to the UPF, a base station or radio node, such as a gNB, which can also be split into a Radio Unit (RU), a Distributed Unit (DU), and a Centralized Unit (CU) for disaggregated virtualized RAN (vRAN) implementations. Underlay transport elements can include any routing/switching/etc. network elements.

Communication between the mobile network elements can involve IP-based or tunnel-based communications, although some of the lower layer gNB disaggregation splits may be Layer 2 (L2)-based communications, such as Common Public Radio Interface (CPRI) or enhanced CPRI (eCPRI) over Ethernet or Radio over Ethernet (RoE) communications.

In a standard IP-based performance monitoring approach, the connection between the UE and the UPF will be seen as a single (IP) hop; however, as is evident from the above, a multitude of elements and protocols can be involved in communications for the UE IP session. In order to properly troubleshoot performance monitoring between the UE and the UPF, it would be advantageous to provide true insights into the underlying hop-by-hop behavior for a 5G/nG access/mobile network (e.g., involving the RAN (gNB/RU/DU/CU) and UPF) including the underlying transport used by the various network elements. Further, it would be advantageous to provide not just the observed performance but also path trace insights to further help pinpoint any potential performance and configuration issues that may be affecting the performance of a UE IP session, for example, in support of network slicing requirements. Additionally, since enterprise entities are typically concerned about specific applications and flows and different applications/flows may traverse different paths of a mobile network (e.g., due to different quality of service (QoS) or related settings), it would be advantageous to enable such performance monitoring and path traces to be performed not just at the IP-level, but at the application/flow-level for a particular UE.

In accordance with embodiments herein, various techniques are provided through which performance tracing can be provided in a mobile network by providing an underlay-level trace for a session of a wireless device in which the underlay-level trace can be initiated or triggered by an enterprise entity that manages policies, traffic, etc. for the wireless device and that is performing an associated enterprise-level trace for the session of the wireless device. The enterprise entity can initiate the underlay-level trace for the session of the wireless device based on either metadata encoded within IP packets of the enterprise-level trace received by the mobile network or based on signaling between the enterprise entity (e.g., a device manager or controller of an enterprise network of the enterprise entity) and the mobile network. The enterprise entity can provide a correlation identifier for the initiated underlay-level trace such that the correlation identifier can be used by the enterprise entity to correlate the mobile network underlay-level trace with the enterprise-level trace being performed by the enterprise entity. Through such techniques as provided by embodiments herein, mobile network per-hop performance for data flows (e.g., uplink and downlink data flows) of the session of the wireless device can be determined (e.g., per RU→DU hop, per DU-CU hop, per CU-UPF hop, per UE→gNB hop, per UE→RU hop, and/or per gNB→UPF hop) for the underlay-level trace provided for the session of the wireless device.

Additionally, in some embodiments, techniques herein can facilitate determining specific underlying transport elements involved for one or more mobile network element hops (e.g., RU-DU hop, etc.) and/or determining underlying transport element per-hop performance for mobile network element hops (e.g., Ethernet, Multiprotocol Label Switching, (MPLS), etc.).

Further, techniques as provided by embodiments herein can help to ensure that end-to-end performance monitoring of data flows for the session of the wireless device can be tied together across different levels of the mobile network through use of the correlation identifier in which such levels can include, but not be limited to, radio bearers on the RAN side, 5G/nG QoS flows (e.g., General Packet Radio Service (GPRS) Tunneling Protocol (GTP)) between the RAN and a UPF (packet core), underlying transport network insights on a per-QoS flow (e.g., GTP), and UPF processing and forwarding of 5G/nG QoS (e.g., at an IP packet level). Additionally, for embodiments involving industrial Internet of Things (IoT) settings, flows may be additionally contextualized based on protocol insights (e.g., deep packet inspection (DPI), etc.), which can be performed in different parts of a mobile network, such as at UE gateway(s), at the UPF, etc. Still further, in some embodiments, for traffic communicated northbound from a UPF toward a data network, further QoS consistency and performance monitoring insights may be provided, such as, for example, for scenarios in which the upstream data network may be a software-defined (SD) access network, an SD wide area network (SD-WAN), or the like.

Figure 1B:
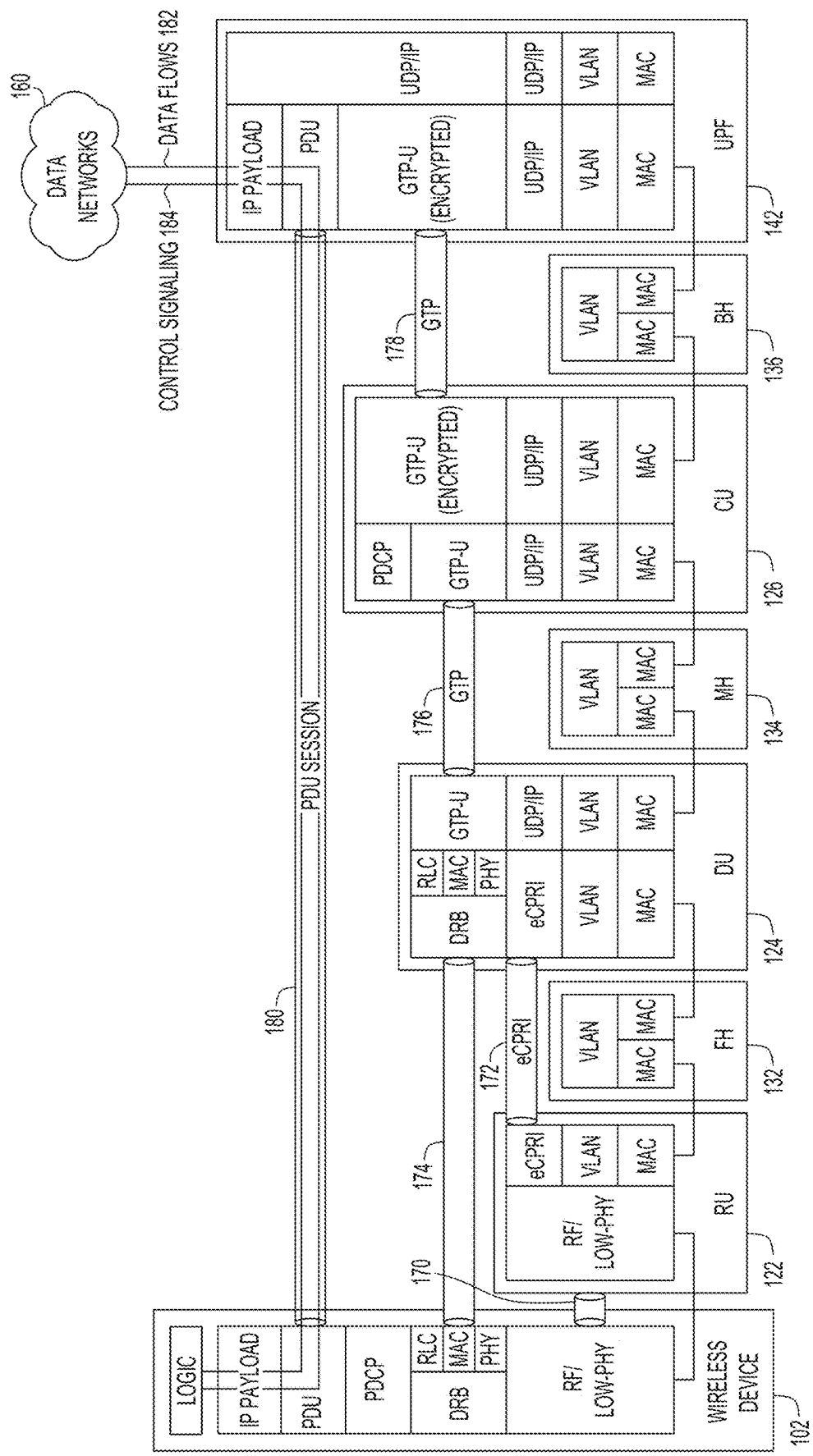
FIG. 1B is a block diagram illustrating various connectivity and protocol layer example details that may be associated with various mobile network elements of the system of FIG. 1A, according to an example embodiment.

Referring to FIG. 1A, FIG. 1A is a block diagram of a system 100 that may facilitate performance tracing in a mobile network environment, according to an example embodiment. System 100 may include a number of wireless devices, such as a wireless device 102, and may also include a mobile network 110 and data networks 160. FIG. 1B is a block diagram illustrating various connectivity and protocol layer example details that may be associated with various mobile network elements of the system of FIG. 1A, according to an example embodiment. FIGS. 1A and 1B are discussed together herein, below. Wireless device 102 may be configured with logic 103 (e.g., any combination of control logic, application logic, enterprise logic, etc.) in order to perform various operations as discussed for embodiments herein.

Mobile network 110 may include a radio access network (RAN), which for the embodiment of FIG. 1A may be implemented as a virtualized RAN (vRAN) 120, and a core network 140. Data networks 160 may include an enterprise network 162 for an enterprise entity (e.g., a business entity, a university entity, a government entity, etc.) and the Internet 168. Enterprise network 162 can include a device manager 164. Mobile network 110 may be operated by a mobile network operator or service provider (SP) that, in at least one embodiment, is considered to be a different operator than the enterprise entity operating enterprise network 162.

In at least one embodiment, vRAN 120 may include a radio unit (RU) 122 configured with trace logic (TL) 123, a fronthaul (FH) network 132, a distributed unit (DU) 124 configured with TL 125, a midhaul (MH) network 134, a centralized or central unit (CU) 126 configured with TL 127, and a backhaul (BH) network 136. In at least one embodiment, core network 140 may include a user plane function (UPF) 142 configured with TL 143, a session management function (SMF) 144, an access and mobility management function (AMF) 146, a policy control function (PCF) 148, and a network exposure function (NEF) 150. Core network 140 may also include a trace manager function (TMF) 152 that can be configured to store/maintain a trace database 154 such that TMF 152/trace database 154 may facilitate various tracing operations discussed for various embodiments herein.

It is to be understood that the mobile core network functions illustrated for the mobile core networks of FIG. 1A are provided for illustrative purposes only and are not meant to limit the broad scope of embodiments herein. Other network functions can be provided for each core network in accordance with any appropriate core network standards, such as 3GPP standards and/or the like. Further, although not shown in FIG. 1A, in some embodiments, RU 122, DU 124, and CU 126 can be collapsed into a gNodeB (also referred to as a gNB) that can be configured with trace logic in a similar manner in order to perform tracing operations as discussed for embodiments herein. Further, it is to be understood that the various radio nodes shown in FIG. 1A, including RU 122, DU 124, and CU 126, may be considered as being network elements that are part of the various FH/MH/BH networks themselves, as opposed to interfacing with such networks. The illustrations of the FH/MH/BH networks shown in FIG. 1A are provided for illustrative purposes only and are not meant to limit the broad scope of embodiments herein.

Generally, per-3GPP standards, an AMF, such as AMF 146, interfaces with an SMF, such as SMF 144, which can further interface with one or more UPFs, such as UPF 142. Each of AMF 146 and SMF 144 can further interface with PCF 148 and, for embodiments in which NEF 150 is provided in core network 140, the NEF 150 can interface TMF 152 of core network 140 and may also interface with one or more functions external to mobile network 110, such as device manager 164 of enterprise network 160. It is to be understood that the NEF 150 may interface with other elements of core network 140, such as PCF 148, SMF 144, etc.

The AMF 146 and the UPF 142 can each further interface with one or more gNBs of a RAN or, for a vRAN, such as vRAN 120, can interface with CU 126. UPF 142 can interface with CU 126 via BH network 136. Further for vRAN 120, CU 126 can interface with DU 124 via MH network 134 and DU 124 can interface with RU 122 via FH network 132.

Each of the user plane elements of core network 140, such as UPF 142, and of vRAN 120, such as CU 126, DU 124, and RU 122, as well as network elements of the FH network 132, the MH network 134, and the BH network 136 transport networks may be capable of interfacing with TMF 152/trace database 154 via any corresponding interface connections utilizing any interface/protocol types, although such connections for vRAN 120 are not shown in FIG. 1A for purposes of brevity only. Further, in some embodiments, device manager 164 of enterprise network 162 may be capable of interfacing with trace database 154 via an Application Programming Interface (API) 156 through which device manager may request/obtain/receive various trace information for performance monitoring traces involving wireless device 102 stored/maintained via trace database 154. Although not shown in FIG. 1A, it is to be understood that TMF 152/trace database 154 can interface with (potentially via NEF 150) any control plane function of core network 140, such as AMF 146, SMF 144, PCF 148, and/or any other control plane functions that may be present for core network 140.

Although not shown in FIG. 1A, each of FH network 132, MH network 134, and BH network 136 may include one or more routers, switches, gateways, load balancers, etc. to facilitate transport network connectivity between the respective network elements of vRAN 120 and between CU 126 and UPF 142. Each of the FH network 132, MH network 134, and BH network 136 can report on packet flows, including the trace flag(s) of the packets, to the trace database 154 via L3 tracing functionality, such as NetFlow and/or any other Layer 3 (L3) tracing functionality.

Turning briefly to FIG. 1B, various example protocol layer and connectivity details are illustrated for wireless device 102 and various network elements, including RU 122, DU 124, CU 126, and UPF 142, as well as for FH network 132, MH network 134, and BH network 136 in which the various protocol layers may facilitate various interface connectivity among various elements as shown in FIGS. 1A and 1B.

For example, UPF 142 may include an IP payload protocol layer, a protocol data unit (PDU) protocol layer, a user plane GTP (GTP-U) protocol layer, various User Datagram Protocol (UDP)/IP protocol layers, a virtual local area network (VLAN) protocol layer, and a Media Access Control (MAC) layer. CU 126 may include a packet data convergence protocol (PDCP) layer to facilitate various radio communications with wireless device 102 and, for various network connectivity, may also include a GTP-U protocol layer, a UDP/IP protocol layer, a VLAN protocol layer, and a MAC protocol layer. DU 124 may include a data radio bearer (DRB) layer, which may include a radio link control (RLC) layer, a MAC layer, and a physical (PHY) layer to facilitate various radio communications with wireless device 102 and, for various network connectivity, DU 124 may include a GTP-U protocol layer, an enhanced Common Public Radio Interface (eCPRI) protocol layer, a VLAN protocol layer, and a MAC protocol layer. RU 122 may include an radio frequency (RF)/lower-PHY protocol layer to facilitate over-the-air RF communications with wireless device 102 and, for various network connectivity, RU 122 may include an eCPRI protocol layer, a VLAN protocol layer, and a MAC protocol layer. Further, wireless device 102 may include an IP payload protocol layer, a PDU protocol layer, a PDCP protocol layer, a DRB/RLC/MAC/PHY protocol layer/layers, and also an RF/lower-PHY protocol layer to perform over-the-air RF communications with RU 122 via an over-the-air RF link, as generally illustrated at 170. Each of BH network 136, MH network 134, and FH network 132, via one or more network elements (not shown) of each transport network, may include a VLAN protocol layer and a MAC layer to facilitate various fronthaul, midhaul, and backhaul transport network connectivity.

One or more PDU sessions can be established between wireless device 102 and UPF 142 for mobile network 110, as is generally understood in the art, such as a PDU session 180, in which various user plane data flows 182 and/or control plane signaling 184 can be communicated between one or more data networks 160 and wireless device 102 or, more generally, logic 103 of wireless device 102. For example, IP packets of the PDU session 180 can be carried via underlying or underlay encapsulation transports provided via a GTP tunnel 178, a GTP tunnel 176, and an eCPRI connection 172 and a data radio bearer (DRB) 174 to facilitate end-to-end network connectivity for data flows of the PDU session 180 of wireless device 102 utilizing various protocol layers of various elements not mobile network 110.

Generally, as shown for FIG. 1B, network connectivity between CU 126 and UPF 142 is provided as IP connectivity, such as GTP-U over IP connectivity, which can be facilitated via GTP tunnel 178 that can carry GTP tunnel encapsulated user plane data flows (e.g., GTP tunnel encapsulations of IP packets) for the PDU session 180 of wireless device 102, such as uplink data flows sent from wireless device 102 that are communicated via vRAN 120 and core network 140 to data networks 160 and downlink data flows (packets) sent from data networks 160 that are communicated via core network 140 and vRAN 120 to wireless device 102, as is generally understood in the art. Further, uplink/downlink data flows for the PDU session 180 of wireless device 102 carried via GTP tunnel 178 can be communicated between CU 126 and UPF 142 via VLAN/MAC routing facilitated via BH network 136 (e.g., various network elements of the network), as is generally understood in the art.

Further as shown in FIG. 1B, GTP-U connectivity between CU 126 and DU 124 can be facilitated via GTP tunnel 176 for uplink/downlink data flows for the PDU session 180 of wireless device 102 in which the data flows carried via GTP tunnel 176 can be communicated between CU 126 and DU 124 via VLAN/MAC routing facilitated via MH network 134, as is generally understood in the art. Additionally, eCPRI connection 172 between DU 124 and RU 122 can carry radio data for a DRB 174 established between wireless device 102 and DU 124 via eCPRI encapsulated packets, as is generally understood in the art. In some instances, fronthaul eCPRI encapsulated payloads between RU 122 and DU 124 may be transported over Ethernet and/or UDP/IP transports.

Generally, an RU, such as RU 122, may implement a wireless wide area (WWA) (e.g., cellular) air interface and, in some instances also a wireless local area (e.g., Wi-Fi®) air interface, for any combination of Radio Access Technology (RAT) types (sometimes referred to more generally as 'accesses') for shared vRAN 120 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, an RU, such as may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more UE, such as any of UE 102.1 and 102.2, may utilize to connect to one or more RUs for one or more sessions (e.g., voice, video, data, gaming, combinations thereof, etc.). More generally, an RU may perform lower Physical (PHY) layer and RF operations to facilitate RF connections with one or more UE.

Thus, an RU, such as RU 122, may include any combination of gNBs/eNBs that may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air RF coverage for one or more access types (e.g., 4G/LTE, 5G/NR, CBRS, Wi-Fi, etc.) through which one or more wireless devices, may utilize to connect to RU 122 for one or more sessions (e.g., voice, video, data, gaming, combinations thereof, etc.), such as PDU session 180, established with core network 140. A DU (also sometimes referred to as a baseband unit), such as DU 124, may provide lower-level operations of the radio signal processing/protocol stack, such as RLC, MAC, and higher PHY layer operations, such as digital processing, including signal modulation, encoding, and scheduling, among others. A CU, such as CU 126, may provide upper-level operations of a radio signal processing/protocol stack, such as user plane PDCP functions, user plane Service Data Adaptation Protocol (SDAP), and others. The split of operations of a radio signal processing stack among between a DU and a CU can be varied depending on implementation and/or configuration of a given vRAN/network architecture. Further, in addition to operations discussed for embodiments herein, a CU, such as CU 126 also operates to control DU(s) for a vRAN architecture, such as vRAN 120, via Radio Resource Control (RRC) functions and the control plane part of the PDCP protocol.

In accordance with embodiments herein, the RU 122, DU 124, and CU 126 can be enhanced via respective TL 123, 125, and 127 to facilitate various tracing operations as discussed for embodiments herein.

A wireless device, such as wireless device 102, and any other wireless devices discussed herein, may be considered any electronic device, etc. that initiates a connection or communication session with a corresponding mobile core network, such as a computer, a mobile phone or mobile communication device, an electronic tablet, a laptop, etc. an electronic device such as an industrial device (e.g., a robot), automation device, enterprise device, appliance, Internet of Things (IoT) device (e.g., sensor, monitor, meter (parking meter, gas meter, water meter, etc.), traffic light, camera/surveillance device, smart device, etc.), a router with a WWA/WLA interface, a WWA/WLA (cellular/Wi-Fi®) enabled device. and/or any other device, component, element, or object capable of initiating voice, audio, video, media, or data exchanges within system 100. Thus, a wireless device may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of a RAN, such as RU 122 of vRAN 120, for one or more sessions with a corresponding mobile core network, such as core network 140.

Generally, an AMF, such as AMF 146 may facilitate access and mobility management control/services for one or more UEs. Generally, an SMF, such as SMF 144 may be responsible for wireless device session management, with individual functions/services being supported on a per-session basis in order to facilitate data transfer(s) between a wireless device and one or more data networks 160 via one or more UPFs, such as UPF 142. Generally, a PCF, such as PCF 148, stores policy data for the system 100 to provide policy control services, such as, for example, to facilitate access control for wireless device 102, network selection, etc.

In accordance with embodiments herein, TMF 152 can provide for the ability to initiate and manage multi-layer performance tracing for wireless device 102 such that underlay tracing information for an underlay trace for wireless device can be stored/maintained via trace database 154 as discussed for embodiments herein. Generally, a NEF, such as NEF 150, can be provided to facilitate interfacing between mobile network operator network functions operating in a "trust" domain of a mobile network operator, such as TMF 152, which may be owned/operated by the mobile network operator of mobile network 110 and one or more application functions outside the mobile network 110, such as device manager 164 of enterprise network 162, that may be considered to be operating in an "untrusted" domain external to the "trust" domain of mobile network 110 and network elements/functions operated therein.

Generally, a UPF, such as UPF 142, may operate to provide packet routing and forwarding operations for user data traffic and may also perform a variety of functions such as packet inspection, traffic optimization, QoS, policy enforcement and user data traffic handling (e.g., to/from one or more data networks 160), and billing operations (e.g., accounting, etc.) for UE sessions. In accordance with embodiments herein, the UPF 142 can be enhanced via TL 143 to facilitate various tracing operations as discussed for embodiments herein.

In various embodiments, the data networks 160 may include be any combination of the Internet, such as Internet 168, a gaming network, an IP Multimedia Subsystem (IMS), an Ethernet data network, Ethernet switching system(s), an enterprise network managed/operated by an enterprise entity, such as enterprise network 162, and/or the like.

Generally, device manager 164 of enterprise network may manage the enterprise operation of wireless device 102 with regard to enterprise policies, etc. that may be within the purview of the enterprise entity operating enterprise network 162, such as subscription(s) of wireless device 102 with one or more mobile networks, such as mobile network 110, access to enterprise applications operated via enterprise network 162 and/or enterprise databases, etc., and/or the like. Thus, wireless device 102 may be considered an 'enterprise-controlled wireless device' in accordance with various embodiments herein.

In some instances, device manager 164 can initiate enterprise-level tracing for data flows of a wireless device such that the enterprise entity can monitor traffic of the wireless device via one or more monitoring tools and/or device manager 164 of enterprise network 162. In some instances, such as for embodiments herein, device manager 164 can initiate enterprise-level tracing for data flows of a wireless device, such as wireless device 102 and can further trigger performance tracing for wireless device 102 to be performed via mobile network 110 and TMF 152 that can thus trigger underlay-level tracing for the PDU session 180 of wireless device 102 that is to be performed via network elements of mobile network 110. A correlation identifier provided by the device manager 164 provides the device manager the ability to tie or correlate together trace information for both the underlay-level trace performed via the mobile network 110 for wireless device 102 and enterprise-level trace information that can be obtained by the device manager 164 for wireless device 102.

Thus, broadly during operation of system 100, embodiments herein provide for the ability to have an enterprise-level trace trigger corresponding performance tracing, also referred to herein as underlay-level tracing, that can be performed via an SP operated mobile network underlay, such as within mobile network 110, for a wireless device managed by the enterprise entity, such as for wireless device 102. A correlation identifier (ID) can be provided by the enterprise network 162/device manager 164 to the mobile network 110/TMF 152 in order to provide for the ability to tie the two traces (enterprise-level and underlay-level) together, thus allowing for end-to-end detailed performance monitoring for data flows of wireless device 102.

In some embodiments, trace results or information generated within mobile network 110 for the underlay-level tracing can be kept private to the mobile network 110 operator and/or can be shared with the enterprise network 162/device manager 164, along with the correlation identifier, such that the enterprise entity can correlate together the trace results/information for the underlay-level tracing with the enterprise-level tracing performed via enterprise network 162.

Such performance monitoring capabilities can thus allow for detailed, real-time visibility for any potential 5G/nG performance issues for both an enterprise entity and/or for a 5G/nG SP/operator in a coordinated fashion and which can be initiated at any time by the enterprise entity or by a 5G/nG SP/operator, as desired.

Correlated tracing between the enterprise and mobile networks for the PDU session 180 for wireless device 102 can be initiated using different data plane and control plane signaling techniques in accordance with various embodiments herein.

For embodiments in which data plane signaling may be used to initiate performance tracing for a session of wireless device 102, enterprise trace packets for an enterprise-trace (being performed via enterprise network 162) involving wireless device 102 sent from enterprise network 162 for a downlink data flow involving PDU session 180 may be enhanced or augmented to contain embedded metadata that, when interpreted by a mobile network node, such as interpreted by UPF 142 via TL 143, can then initiate a corresponding underlay-level trace to be performed for the path through mobile network traversed by data flows of the PDU session 180.

The data plane signaling can also be used to provide the correlation identifier that is to be used (by the enterprise entity/device manager 164) for correlating together tracing information for enterprise-level trace and the underlay-level trace for the performance monitoring for the session of the wireless device. In various embodiments, a correlation identifier can be represented using any alphanumeric string, value, and/or the like that can be used to correlate together multiple traces for a session of a wireless device, such as wireless device 102.

The correlation identifier along with 5-tuple session identifying information for the data flows for the session 180 of the wireless device 102, including source IP address, destination IP address, source port, destination port, and protocol identifier can be used along with a unique trace flag that can be added to the headers of IP packets and headers of encapsulated IP packets in order to identify the various underlay trace information obtained for uplink/downlink data flows involved in the multi-layer performance monitoring performed for the PDU session 180 of the wireless device 102.

In various embodiments, data plane encoding techniques/metadata that can be included in downlink data flow packets in order to trigger performance (underlay-level) tracing for a PDU session of a wireless device and also to provide a correlation identifier for such tracing may include, but not be limited to any combination of Layer 3 (L3), Layer 4 (L4), and/or Layer 7 (L7) metadata that can be included in one or more downlink packets in order to trigger the performance tracing within mobile network 110.

In some embodiments, L3 metadata may include metadata included in one or more IP headers, such as within IP version 4 (IPv4) Differentiated Services Code Point (DSCP) markings using odd-numbered values not defined by the Internet Engineering Task Force (IETF) or within IP version 6 (IPv6) extension headers, which can be used to initiate tracing and/or provide a correlation identifier to be used for performance tracing. In some embodiments, L4 metadata can include Transmission Control Protocol (TCP) options metadata that can be used to initiate tracing and/or provide a correlation identifier to be used for performance (underlay-level) tracing. In some embodiments, L7 metadata can include Hypertext Transfer Protocol (HTTP) header metadata that can be used to initiate tracing and/or provide a correlation identifier to be used for performance tracing.

In some embodiments, inclusion of a correlation identifier as metadata within a certain L3/L4/L7 header field of data plane packet(s) for a session of a wireless device can facilitate both triggering performance tracing for the session of the wireless device and providing the correlation identifier that is to be used for correlating together tracing information obtained for the mobile network 110 provided underlay-level trace with tracing information obtained for the enterprise network provided enterprise-level trace for the wireless device 102.

For embodiments involving control plane signaling that can be used to initiate performance tracing for a session of wireless device 102, device manager 164 of enterprise network 162 may have a controller-based connection with the TMF 152 via NEF 150 over which the enterprise entity could signal triggering data associated with performance tracing that is to be initiated for wireless device 102.

In various embodiments, the triggering data could include 5-tuple session identifying information for the uplink/downlink data flows for the session of the wireless device 102 along with a correlation identifier to be used for correlating together the underlay-level trace for the PDU session 180 for wireless device 102 and an enterprise-level trace being performed for the wireless device 102 via enterprise network 162/device manager 164. The control plane triggering data could be signaled to TMF 152 via NEF 150 that can recognize the combination of triggering data in order to initiate the corresponding underlay-level for both uplink data flows (e.g., started at the wireless device 102 and carried through the RAN bearer, etc.) and downlink data flows (e.g., started at the UPF 142 and carried through GTP tunnels, etc.) for the PDU session 180 of wireless device 102.

The control plane signaling technique obviates the need for manipulation of packets in the data plane via enterprise network 162 at the cost of involving control channel between the enterprise network 162/device manager 164 and core network 140/TMF 152.

Thus, embodiments herein provide for the ability to initiate a 5G underlay-level trace based on either metadata encoded within an enterprise-level trace (data plane) or based on signaling between an enterprise network and a mobile network/core network (control plane), and also provide for the ability to tie the two disparate traces together with a correlation identifier in order to provide comprehensive end-to-end trace information that may be useable and valuable to both parties. Additional operational details that may be associated with various embodiments herein are discussed in further detail below with reference to FIGS. 2A and 2B.

Figure 2A:
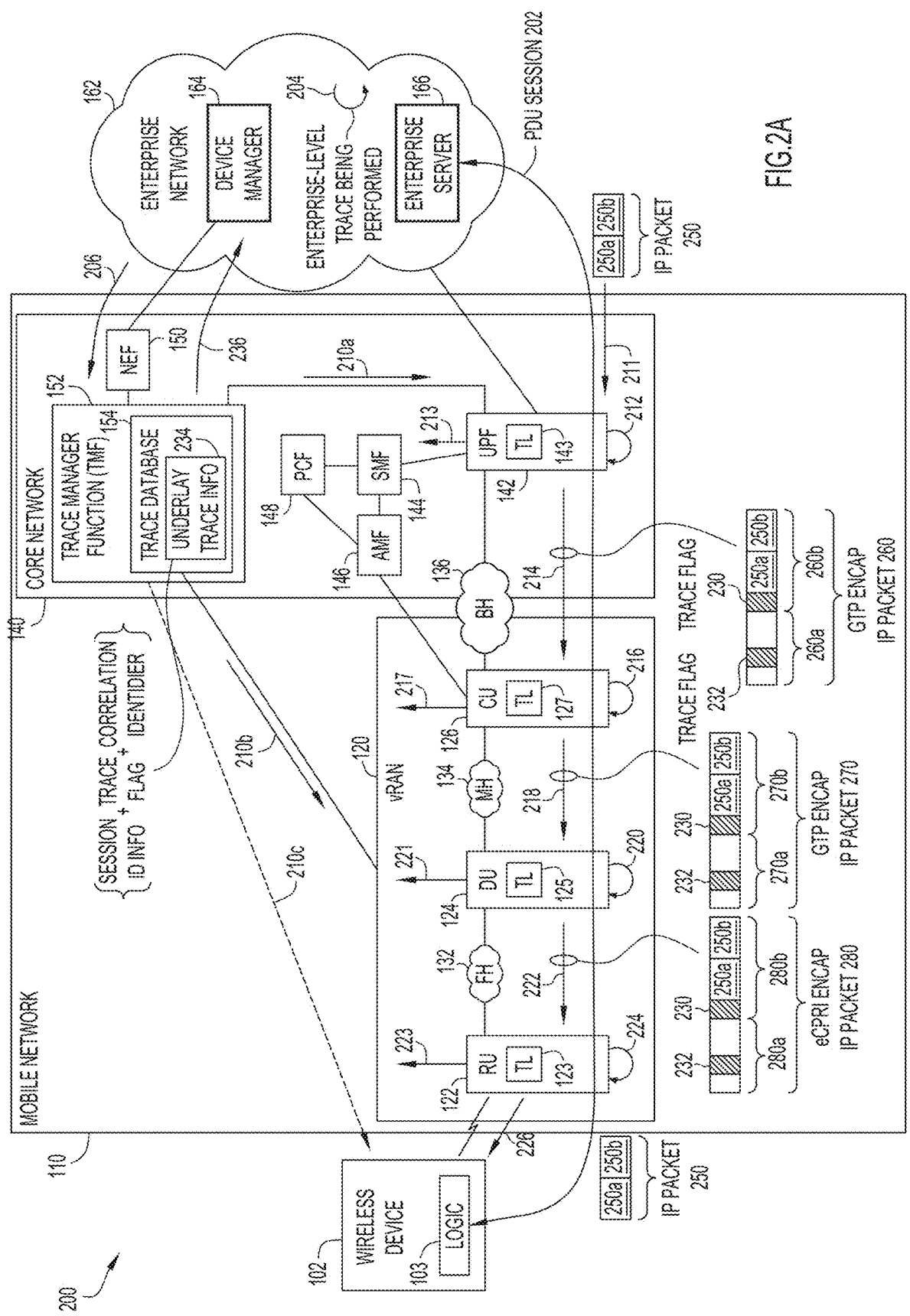
FIG. 2A is a block diagram illustrating example operations that may be performed to facilitate performance tracing for the system of FIG. 1A, according to an example embodiment.

Broadly, various operations discussed herein and illustrated, for example, for embodiment of FIG. 2A, involve the novel use of the multi-layer correlation identifier and a specific trace flag that can imposed on both the inner and outer headers of a 5G packet flow for a session of a wireless device (such as wireless device 102) in order to facilitate underlay-level tracing for the session of the wireless device and also for correlating underlay trace information obtained via the underlay-level tracing in order to correlate the underlay trace information with enterprise trace information obtained by an enterprise via enterprise-level tracing for the packet flow of the wireless device.

Figure 2B:
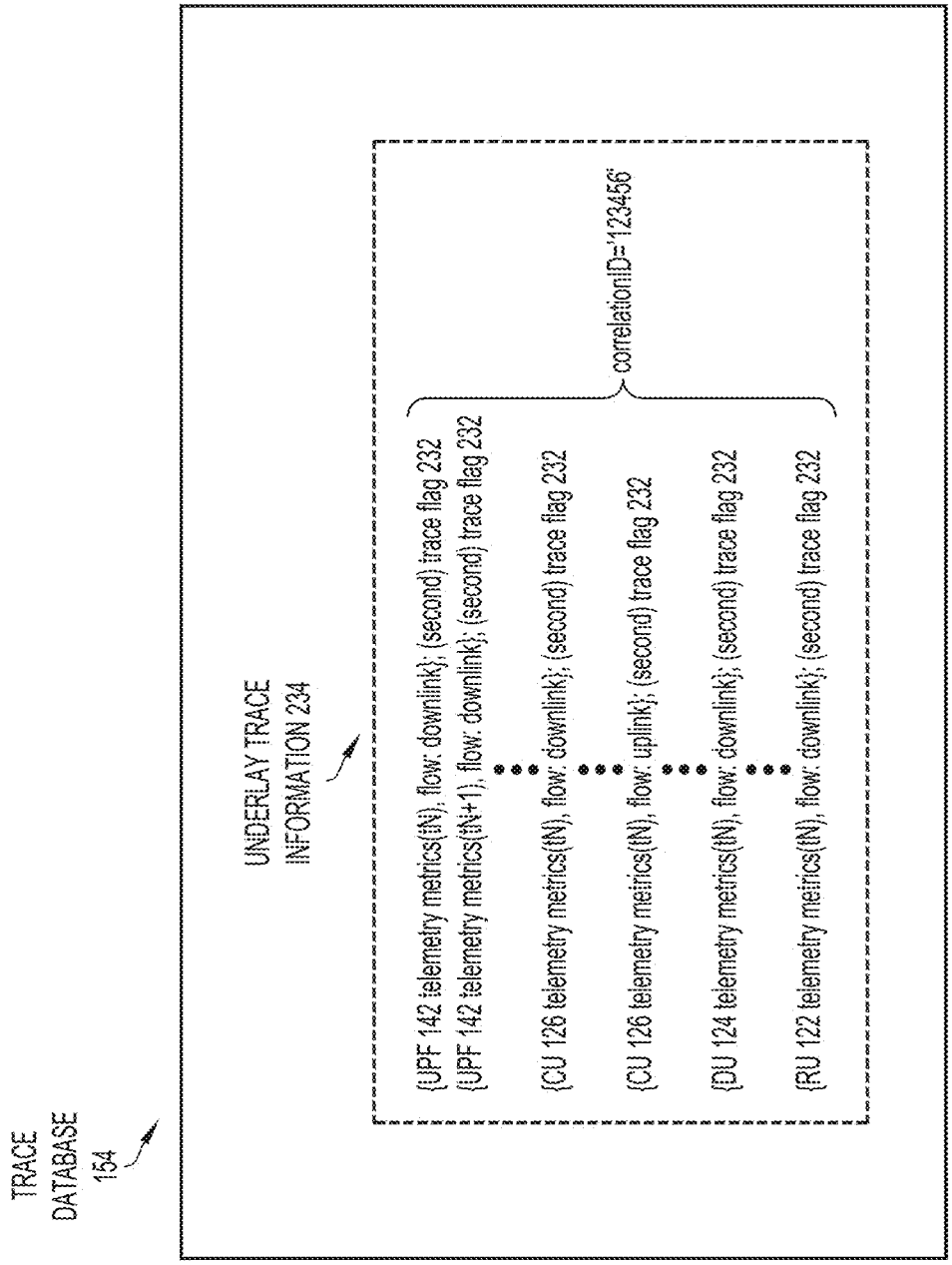
FIG. 2B is a diagram illustrating example underlay trace information that can be stored in association with a correlation identifier for performance tracing for a wireless device session, according to an example embodiment.

With reference to FIG. 2A, FIG. 2A is a block diagram 200 illustrating various example operations that may be performed to facilitate performance tracing for wireless device 102 for the system of FIG. 1A, according to an example embodiment. FIG. 2B is a diagram illustrating example underlay trace information that can be stored in association with a correlation identifier for the performance tracing performed for the wireless device 102, according to an example embodiment, and is discussed with reference to FIG. 2A.

FIG. 2A includes wireless device 102, mobile network 110, and enterprise network 162, which for the embodiment of FIG. 2A include device manager 164 and an enterprise server 166. Enterprise server 166 may represent any enterprise service with which wireless device 102 may have a communication session established (e.g., a collaboration service, etc.) via a PDU session, such as a PDU session 202, established via mobile network 110 that facilitates communications between the enterprise server and wireless device 102.

For the embodiment of FIG. 2A, consider that control plane signaling provided by device manager 164/enterprise network 162 is utilized to trigger performance (underlay-level) tracing via mobile network 110 for the PDU session 202 for wireless device 102. Thus, for the embodiment of FIG. 2A, core network 140 may include NEF 150 along with PCF 148, SMF 144, AMF 146, TMF 152 including trace database 154, and UPF 142 having TL 143. The vRAN 120 can include RU 122 having TL 123, DU 124 having TL 125, and CU 126 having TL 127, along with FH network 132, MH network 134 and BH network 136.

As shown at 204, consider that an enterprise-level trace is being performed for the uplink/downlink data flows for the PDU session 202 of wireless device 102 and enterprise server 166. As shown at 206, consider that device manager 164 triggers performance (underlay-level) tracing for the PDU session 202 of wireless device 102 via a control plane message communicated to TMF 152 via NEF 150 that includes session identifying information for the PDU session 202 of wireless device 102 (e.g., 5-tuple information including source/destination IP addresses, source/destination port numbers, and protocol information) and a correlation identifier (e.g., correlationID='123456') that is to be stored in association with underlay trace information 234 collected via mobile network 110 for the underlay-level trace that is to be performed via the mobile network 110 and stored via trace database 154 for the PDU session 202 of wireless device 102.

As shown at 208, TMF 152 can generate unique trace flag(s) to be utilized for the underlay-level tracing performed via mobile network 110 for the PDU session 202 of wireless device 102. The generated trace flag(s) are considered unique to the PDU session 202 of wireless device 102 for which performance (underlay-level) tracing is to be initiated. For example, in some embodiments, wireless device 102 may have other PDU sessions established via mobile network 110 in addition to PDU session 202. Thus, the trace flag(s) generated for the specific PDU session 202 for which performance tracing is to be provided via the mobile network 110 are unique for identifying the uplink/downlink data flows and corresponding underlay trace information generated via the underlay-level trace provided via mobile network 110.

The generating at 208 can include generating a first trace flag (referred to and shown for the embodiment of FIGS. 2A and 2B as trace flag 230) that is to be inserted into a header of IP packets for the downlink data flow obtained by UPF 142 from enterprise network 162/enterprise server 166 and that may be inserted in a header of IP packets for the uplink data flow either by wireless device 102 or by RU 122 (via TL 123) for the PDU session 202. In some embodiments, wireless devices may be incapable of supporting underlay-level tracing for a mobile network; thus, in such embodiments, RU 122 can be configured to insert the first trace flag into the header of IP packets received from such wireless devices.

Further at 208, TMF 152 can generate a second trace flag (referred to and shown for the embodiment of FIGS. 2A and 2B as trace flag 232) that is to be inserted into a header of encapsulations of the IP packets by various network elements of mobile network 110, as discussed in further detail below.

The first trace flag and the second trace flag generated for an underlay-level trace that is to be performed for a session of a wireless device can be any alphanumeric string, value, and/or the like that can be used to uniquely identify the underlay-level trace performed for the particular session for the wireless device by any network element of a mobile network, including RAN/vRAN network elements and core network elements of the mobile network. A trace flag can be considered a trace identifier (ID) for a given trace.

In some embodiments, the second trace flag may be identical to the first trace flag; however, in other embodiments, the second trace flag may be a hash or some other converted form of the first trace flag.

TMF 152 can provide/store the second trace flag 232 via the trace database 154, which can store the second trace flag in association with underlay trace information 234 stored for the underlay-level trace of the PDU session 202 of mobile device 102 and the correlation identifier for the underlay-level trace as obtained from the enterprise.

As shown at 210*a*, TMF 152 can signal to the UPF 142 including TL 143 to initiate the underlay-level trace for the PDU session 202 of wireless device 102 in which the signaling can include session identifying information to allow the UPF to identify uplink/downlink data flows for the PDU session and may also include the first trace flag 230 and, optionally, the second trace flag 232 that are to be used to augment headers of IP packets and encapsulations of the IP packets for the data flows. If the second trace flag 232 is to merely be a copy of the first trace flag 230, the signaling may only include sending the first trace flag 230 to the UPF 142. If the UPF 142 only receives one trace flag in the signaling, such an indication can indicate to the UPF 142 that it is to use the single trace flag as both the first and second trace flags for downlink data flows involved in the underlay-level tracing.

As shown at 210*b*, TMF 152 can signal to the CU 126 including TL 127, the DU 124 including TL 125, and the RU 122 including TL 123 to initiate the underlay-level trace for the PDU session 202 of wireless device 102.

In at least one embodiment, the signaling at 210*b* can include sending only one trace flag to RU 122 (i.e., the first trace flag 230) along with tracing instructions that are to enable the RU 122 (via TL 123) to identify the first trace flag within (uplink) IP packets received from wireless device 102 for the PDU session 202, which include the first trace flag as inserted into the IP packets by the wireless device 102, and to copy the first trace flag 230 and provide the copy as the second trace flag 232 that is to be included into the header of eCPRI encapsulations of the IP packets that are sent to DU 124.

In another embodiment, if the wireless device 102 is incapable of including the first trace flag 230 within uplink IP packets sent to RU 122, the signaling at 210*b* can include sending the first trace flag 230, optionally the second trace flag 232 (e.g., if the second trace flag is not to be a copy of the first trace flag), and session identifying information for the PDU session 202 of wireless device 102 along with instructions that are to enable the RU 122 to identify IP packets received from wireless device 102 for the PDU session 202 and to include the first trace flag 230 in the header of the IP packets and to include the second trace flag 232 into the header of eCPRI encapsulations of the IP packets that are sent to DU 124.

Further for the signaling at 210*b*, the TMF 152 can signal to the CU 126 and the DU 124 that each are to copy the second trace flag for incoming encapsulations of the IP packets (eCPRI or GTP encapsulations) and provide the second trace flag for outgoing encapsulations of the IP packets that are sent to another network element of the mobile network for the PDU session 202 of the wireless device 102.

As shown at 210*c*, in some embodiments, for example, if wireless device 102 is capable of inserting the first trace flag 230 into uplink IP packets for the PDU session, TMF 152 can signal underlay-level tracing instructions to wireless device 102 that includes the first trace flag 230 and session identifying information for the PDU session 202.

Thus, broadly, the 5G core network via TMF 152 can signal to the wireless device 102 (if capable) to impose a uniquely generated trace flag in a header field of an IPv4 or v6 header (at the source) of IP packets sent to the core network. The 5G core network via TMF 152 can also signal to the RU, CU, and DU to copy the trace flag to appropriate header fields of external eCPRI or GTP headers for encapsulations of the IP packets. Thus, upstream, when a packet reaches the vRAN 120, the trace flag can, in at least some embodiments, be first copied to the eCPRI header at the RU 122, then to the GTP header at the DU 124; thus, maintaining continuity of an externally visible field that allows the underlay to identify the actual internal flow of IP packets for the PDU session 202, and finally to the GTP header of encapsulations sent from the CU 126 to the UPF 142. Thus, the first and second trace flags allow direct correlation of an inner and outer packet flow at all points in the mobile network 110. Further, any of the FH network 132, MH network 134, and BH network 136 (e.g., network elements thereof) can also generate telemetry data (e.g., via L3 NetFlow monitoring, etc.) that will include the external header/trace flag and, hence, can be used to provide further insights into the underlying transport network performance.

In addition, an external indexing database, such as trace database 154 provided via TMF 152, which is accessible by any networking device of mobile network 110, can be used to store underlay trace information 234 for the underlay-level trace provided for the PDU session 202 of wireless device 102 in which the underlay trace information 234, which can include any telemetry metrics (e.g., receive time, transmit time, dropped packets, etc.) determined for the underlay-level trace, that can be stored in association with the second trace flag 232 generated for the underlay-level trace and the correlation identifier such that the second trace flag 232 may allow any networking device to simply observe the outer encapsulation (second) trace flag and index it to the inner IP packet.

Thus, any underlay networking device of mobile network 110 can access the trace database 154 in order to report or update the underlay trace information 234 for the underlay-level trace as the (second) trace flag is observed for encapsulated flows for the PDU session 202 of the wireless device. Further, any underlay networking device of mobile network 110 can trace the path of the underlay-level trace for the PDU session 202 of wireless device 102 based on the (second) trace flag that is carried in either eCPRI or GTP headers of encapsulations of the IP packets of the session.

Returning to the present operations involving the embodiment of FIG. 2A, an example (downlink) IP packet 250 involved in the enterprise-level tracing being performed for the session of wireless device is shown in FIG. 2A in which the IP packet 250 can be sent from enterprise server 166 to UPF 142, as shown at 211. The IP packet 250 can include a header (portion) 250*a* and a payload (portion) 250*b*. Upon receiving the IP packet 250, the UPF 142 can identify, as generally shown at 212, the IP packet 250 utilizing the session identifying information obtained from TMF 152 (at 210*a*) and based on source/destination IP address information, etc. included in the header 250*a* that matches the session identifying information obtained from TMF 152 in order to initiate the underlay-level trace for the downlink data flow of the PDU session 202 of wireless device 102. Initiating the underlay-level trace as shown at 212 can include providing the first trace flag 230 in the header 250*a*

(e.g., via IPv4 DSCP using an odd-value not defined by the IETF or via an IPv6 extension header) of the IP packet 250 and providing the second trace flag 232 in a GTP header 260*a* of a GTP tunnel encapsulation (encap) 260 of the IP packet 250 in which the IP packet 250 may make up a GTP payload 260*b* of the GTP tunnel encapsulation 260 of the IP packet 250 that can be sent to CU 126, as shown generally shown at 214, via a GTP tunnel (not shown in FIG. 2A) established for the PDU session 202 of wireless device 102 between CU 126 and UPF 142.

In accordance with embodiments herein, a GTP extension header can be augmented to the GTP header of a GTP encapsulated IP packet in order to carry the second trace flag (or any underlay tracing type trace flag) for an underlay-level trace provided for a PDU session of a wireless device.

As shown at 213, the UPF 142 can report underlay trace information 234 to trace database 154 (e.g., time of receiving IP packet 250, time of transmitting the GTP encapsulation 260 of the IP packet, any other trace telemetry metrics, identifying information of UPF 142, etc.) along with the second trace flag 232 that can be used to index/store the underlay trace information 234 into trace database 154.

Upon receiving the GTP encapsulation 260 of the IP packet 250, CU 126 can, as generally shown at 216, copy the second trace flag 232 from the GTP header 260*a* of the incoming encapsulation of the IP packet and provide the second trace flag for a GTP header 270*a* of a GTP tunnel encapsulation (encap) 270 of the IP packet 250 in which the IP packet 250 may make up a GTP payload 270*b* of the GTP tunnel encapsulation 270 of the IP packet 250 that can be sent to DU 124, as generally shown at 218, via a GTP tunnel (not shown in FIG. 2A) established for the PDU session 202 of wireless device 102 between CU 126 and DU 124.

As shown at 217, the CU 126 can report underlay trace information 234 to trace database 154 (e.g., time of receiving the GTP encapsulation 260 of the IP packet, time of transmitting the GTP encapsulation 270 of the IP packet, any other trace telemetry metrics, identifying information of CU 126, etc.) along with the second trace flag 232 that can be used to index/store the underlay trace information 234 into trace database 154.

Next, upon receiving the GTP encapsulation 270 of the IP packet 250, DU 124 can, as generally shown at 220, copy the second trace flag 232 from the GTP header 270*a* of the incoming encapsulation of the IP packet and provide the second trace flag 232 for an eCPRI header 280*a* of an eCPRI encapsulation (encap) 280 of the IP packet 250 in which the IP packet 250 may make up an eCPRI payload 280*b* of the eCPRI encapsulation 280 of the IP packet 250 that can be sent to RU 122, as generally shown at 222, via an eCPRI connection (not shown in FIG. 2A) established for the PDU session 202 of wireless device 102 between DU 124 and RU 122. In various embodiments, the second trace flag 232 can be included in any of eCPRI message types 64-255 within the eCPRI header of eCPRI encapsulations of IP packets for the PDU session of the wireless device.

As shown at 221, the DU 124 can report underlay trace information 234 to trace database 154 (e.g., time of receiving the GTP encapsulation 270 of the IP packet, time of transmitting the eCPRI encapsulation 280 of the IP packet, any other trace telemetry metrics, identifying information of DU 124, etc.) along with the second trace flag 232 that can be used to index/store the underlay trace information 234 into trace database 154.

Upon receiving the eCPRI encapsulation 280 of the IP packet 250, RU 122 can, as generally shown at 224, remove the eCPRI encapsulation 280 and, as shown at 226, forward the IP packet 250 to wireless device 102. For embodiments in which control plane signaling is used to initiate the underlay-level trace, the first trace flag is removed; however for embodiments in which data plane signaling is used to initiate the underlay-level trace, the first trace can be left in the IP packet as an indication to the wireless device 102 that the tracing is being performed. As shown at 223, the RU 122 can report underlay trace information 234 to trace database 154 (e.g., time of receiving the eCPRI encapsulation 280 of the IP packet, time of transmitting the IP packet 250 to wireless device 102, any other trace telemetry metrics, identifying information of RU 122, etc.) along with the second trace flag 232 that can be used to index/store the underlay trace information 234 into trace database 154.

Operations for transmitting encapsulations of uplink IP packets received from wireless device 102 via RU 122, DU 124, and CU 126, as well as reporting underlay trace information 234 for the underlay-level trace involving the uplink IP packets can be performed in a similar manner as the downlink operations, with the various caveats as noted above for the signaling at 210*b* and various operations that RU 122 may perform depending on whether the wireless device 102 may or may not be capable of including the first trace flag in a header of the uplink IP packets sent to the RU 122. Further, UPF 142, upon receiving a GTP encapsulated uplink packet from CU 126, can remove the encapsulation and remove the first trace flag 230 from uplink IP packets prior to sending the uplink IP packets towards enterprise server 166 and can report any underlay trace information 234 (e.g., time of receiving the GTP encapsulated uplink IP packet from CU 126, time of transmitting the uplink IP packet towards enterprise server 166, any other trace telemetry metrics, identifying information of UPF 142, etc.) to trace database 154.

In addition to reporting underlay trace information 234 to trace database 154, each network element of core network 140 and vRAN 120 may also obtain underlay trace information 234 from trace database 154 to perform additional trace operations, determine additional trace metrics, etc. in accordance with embodiments herein. For example, a given network element, such as CU 126 can query trace database 154 using the second trace flag 232 along with various request parameters in order to obtain certain underlay trace information 234 from trace database to perform one or more operations.

As shown in FIG. 2B, underlay trace information 234 stored in trace database 154 can be stored for both uplink and downlink data flows involving the PDU session 202 of wireless device 102. As shown in FIG. 2B, the underlay trace information 234 can be stored along with the second trace flag 232, which is the outer trace flag that is utilized by various network elements of each hop of the packet flows involving PDU session 202 to identify flows involved in the underlay-level trace and also to index the telemetry metrics stored via trace database 154. The underlay trace information 234 can include any combination of telemetry metrics, session/flow identifying information, such as uplink/downlink tuple information and/or any other session identifying information, and/or the like and is further stored in association with the correlation identifier (e.g., correlationID='123456') as provided by the enterprise network 162/device manager 164 with the trigger initiating the underlay-level trace for the PDU session 202 of wireless device 102. The example details shown in FIG. 2B are provided for illustrative purposes only and are not meant to limit the broad scope of embodiments herein. For example, in addition to trace information obtained from the UPF 142, CU 126, DU 124, and RU 122, telemetry information obtained from FH network 132, MH network 134, and/or BH network 136. Further, underlay-level trace information can be stored via mobile network 110 in virtually any format.

At any time during the underlay-level tracing performed via mobile network 110, underlay trace information 234 can be sent to the enterprise network 162/device manager 164, as generally shown at 236, along with the correlation identifier that was originally included with the trigger sent from device manager 164 to initiate the underlay-level trace for the PDU session 202 of the wireless device. Any trace flag(s) included in the underlay trace information 234 can be removed from the information sent to the enterprise network 162/device manager 164. In various embodiments, the underlay trace information 234 can be sent to the enterprise network 162/device manager 164 upon receiving a request by the TMF 152 (e.g., via NEF 150) and/or by/trace database 154 (e.g., if an API, such as API 156 is configured for trace database 154) from the enterprise network 162/device manager 164 that includes the correlation identifier, periodically as triggered by the TMF 152/trace database 154, as triggered by any network element of core network 140 and/or vRAN 120, and/or any combination or variations thereof.

Using the correlation identifier, the underlay trace information 234 obtained from the TMF 152/trace database 154 can be correlated to enterprise tracing information tracked/obtained by device manager 164 for the enterprise-level trace being performed via device manager 164 (e.g., transmit time of downlink IP packets sent from enterprise server 166, receive time of uplink IP packets received by enterprise server 166, dropped packets, etc.) such that embodiments herein may facilitate end-to-end multi-layer performance monitoring for communications involving the PDU session 202 of wireless device 102.

The use of this correlation capability thus allows the continuity of the trace to be enabled across multiple layers of the network, end-to-end, thereby opening up visibility, troubleshooting, and/or analysis functionality that may not have been previously possible using only enterprise-level tracing or only underlay-level tracing. As the multiple levels of correlation (being inter-related) can be directly tied together, they can be associated in the time domain as well, enabling the identification of even intermittent faults or failures, pinpointing these to specific network locations or functions, etc.

Such correlation of multiple levels of tracing may be especially valuable when a trace may be initiated by one party (for example, an Enterprise customer of a 5G service), but then can automatically trigger a second correlated trace with a second party (for example, a 5G SP), with the direct and time-correlated capability to tie these multiple traces together for direct, immediate visibility as well as fault identification and isolation. Furthermore, such correlated tracing techniques as provided by embodiments herein may enable tracing to be done not just at the IP-level. For example, by leveraging contextual knowledge about actual process flows being supported in an industrial network via DPI (e.g., provided by application analysis logic implemented in an edge router or the UPF), embodiments herein can provide for a full-stack packet trace to an end-user, which is typically what operational technology (OT) users care most about (seeing issues in the context of an actual OT process rather than as an IP network issue).

Although the example operations discussed for FIGS. 2A and 2B involve control plane signaling that can be used to trigger underlay-level tracing by an enterprise network/device manager, similar operations may be performed for underlay-level tracing triggered via date plane encoding of the incoming IP packets sent from enterprise server 166 to UPF 142 and/or via data plane triggering that may be initiated by mobile device 102. In such embodiments, TMF 152 can signal instructions to UPF 142 and, optionally, RU 122 (if wireless device 102 is not capable of initiating such underlay-level tracing itself) to look for any combination of specific L3, L4, and/or L7 header metadata that is to be used to trigger underlay-level tracing for a PDU session of the wireless device 102. The specific combination L3, L4, and/or L7 header metadata can be agreed upon between the SP/operator of mobile network and the enterprise entity of operating enterprise network 162/device manager 164, such that underlay tracing detection rules can be installed in the user plane network elements of mobile network 110. The data plane metadata may include the trigger to initiate underlay-level tracing and a correlation identifier to be utilized to correlate the underlay trace information generated for the underlay-level trace with enterprise trace information generated for the enterprise-level trace being performed for the PDU session of the wireless device.

In such embodiments, upon detecting an underlay-level tracing being triggered via an enterprise-level trace packet, say, for example, by UPF 142 via TL 143, the UPF 142 can provide session identifying information for the PDU session for which the underlay-level tracing has been initiated to TMF 152, which can initiate various signaling to other network elements and trace database regarding the unique trace flag(s) generated for the underlay-level trace, along with any other relevant instructions, as applicable (e.g., copying of the (outer) trace flag for any encapsulated IP packets sent from one network element to another network element, etc.).

Figure 3:
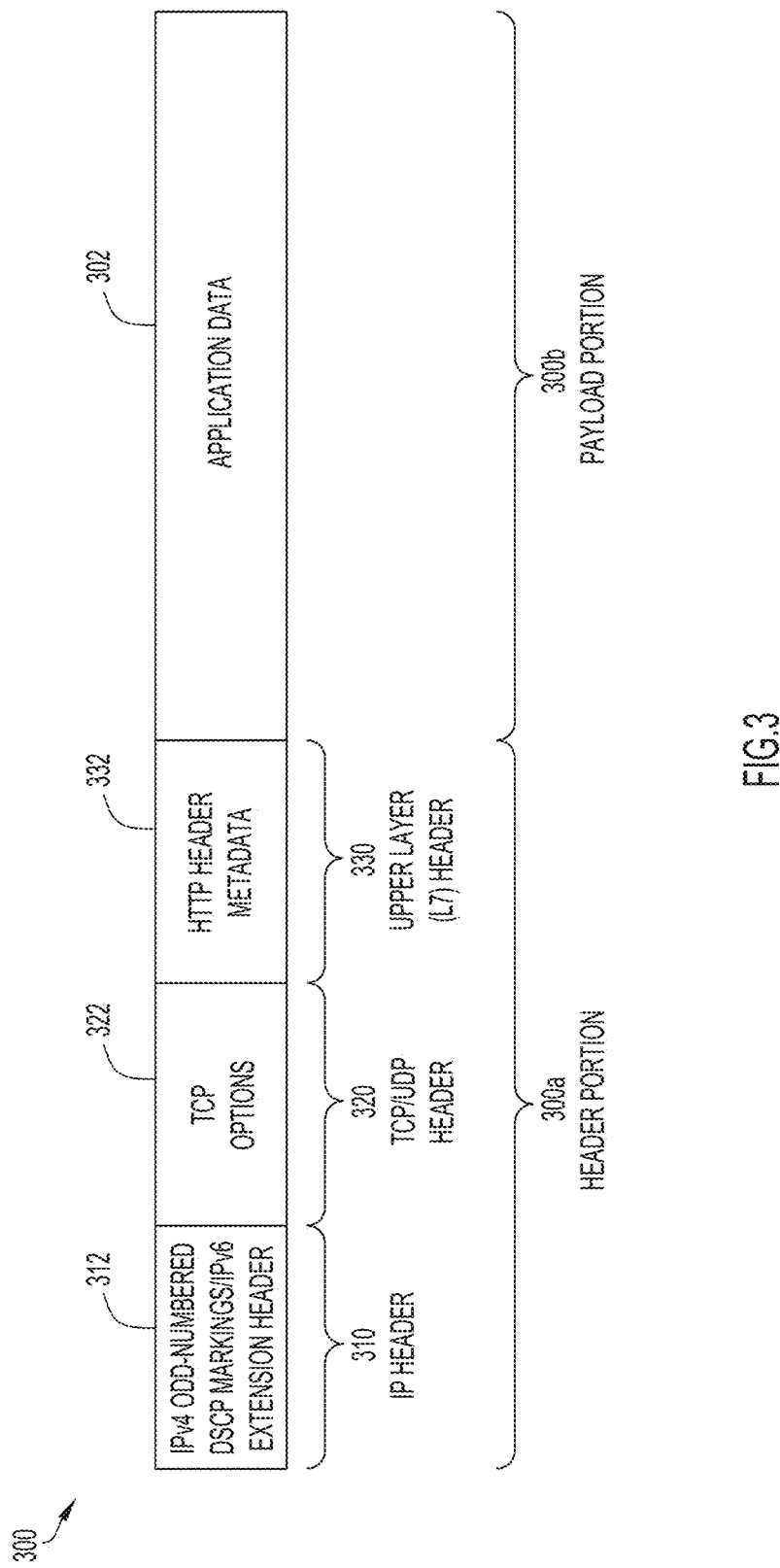
FIG. 3 is a schematic diagram illustrating example details for an example IP packet format that can be augmented to carry a trigger to initiate underlay-level tracing for a session of a wireless device and to carry a correlation identifier that a mobile network can store in association with underlay tracing information gathered for the underlay-level trace, according to an example embodiment.

Referring to FIG. 3, FIG. 3 is a schematic diagram illustrating example details for an example IP packet 300 format that can be augmented to carry a trigger to initiate underlay-level tracing for a PDU session of a wireless device and to carry a correlation identifier that the mobile network is to store in association with underlay tracing information gathered for the underlay-level trace.

As shown in FIG. 3, the IP packet 300 can include a header portion 300a and a payload portion 300b. The payload portion 300b can include any (upper layer) application data 302. The header portion 300a can include various headers, such as a (L3) IP header 310, a (L4) TCP/UDP header 320, and various upper layer (e.g., L7) headers 330. As discussed for various embodiments, the trigger to initiate underlay-level tracing for a PDU session of a wireless device and to carry a correlation identifier that the mobile network is to store in association with underlay tracing information gathered for the underlay-level trace can be carried in any combination of IPv4 odd-numbered DSCP markings and/or IPv6 Extension Header 312 within IP header 310, TCP options 322 within TCP/UDP header 320, and/or HTTP header metadata 332 within any upper layer headers 330.

Figure 4:
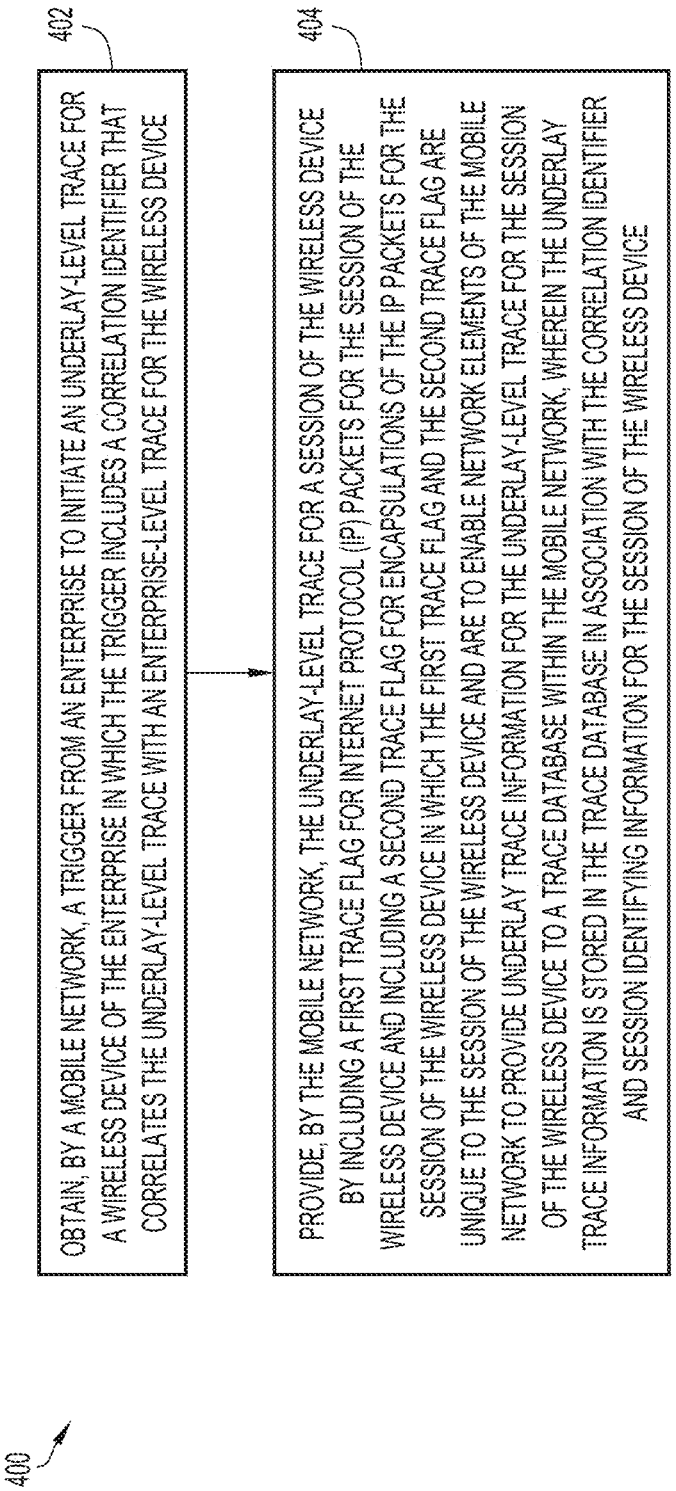
FIG. 4 is a flowchart depicting a method according to an example embodiment.

Referring to FIG. 4, FIG. 4 is a flowchart depicting a method according to an example embodiment. In at least one embodiment, method 400 may be associated with techniques that may be utilized to facilitate underlay-level tracing for a PDU session of a wireless device via a mobile network and to facilitate correlating the underlay-level tracing to an enterprise-level trace for the wireless device, according to an example embodiment. In various embodiments, method 400 may be performed by a computing device or combination of computing devices as discussed for embodiments herein, such as one or more mobile network element, including any combination of TMF 152 and/or UPF 142 of core network 140 and/or RU 122, DU 124, and/or CU 126 of vRAN 120.

As shown at 402, the method may include obtaining, by a mobile network, a trigger from an enterprise to initiate an underlay-level trace for a wireless device of the enterprise in which the trigger includes a correlation identifier that correlates the underlay-level trace with an enterprise-level trace for the wireless device.

For example, in one embodiment, the trigger including the correlation identifier obtained from the enterprise to initiate the underlay-level trace for the session of the wireless device can be obtained via control plane signaling from the enterprise by a trace manager function of the mobile network, such as trace manager function (TMF) 152. In another embodiment, the trigger including the correlation identifier obtained from the enterprise to initiate the underlay-level trace for the session of the wireless device can be obtained via data plane signaling from the enterprise by a UPF (e.g., UPF 142) of the mobile network that is facilitating the session of the wireless device.

At 404, the method may include providing, by the mobile network, the underlay-level trace for a session of the wireless device by including a first trace flag for Internet Protocol (IP) packets for the session of the wireless device and including a second trace flag for encapsulations of the IP packets for the session of the wireless device in which the first trace flag and the second trace flag are unique to the session of the wireless device and are to enable network elements of the mobile network to provide underlay trace information for the underlay-level trace for the session of the wireless device to a trace database within the mobile network, wherein the underlay trace information is stored in the trace database in association with the correlation identifier and session identifying information for the session of the wireless device.

For example, for a downlink data flow of the session of the wireless device, the first trace flag can be provided by a UPF (e.g., UPF 142) of the mobile network for a header of the IP packets for the session of the wireless device and the second trace flag can be provided by the UPF for a header GTP tunnel encapsulations of the IP packets for the session of the wireless device that are to be sent to a downstream radio node, such as to CU 126 for vRAN 120 or to a gNB for a non-virtualized RAN implementation.

In another example, for an uplink data flow of the session of the wireless device, the first trace flag can be provided by one of the wireless device or an RU of the mobile network (e.g., RU 122) for a header of the IP packets for the session of the wireless device and the second trace flag can be provided by the RU of the mobile network for a header of eCPRI encapsulations of the IP packets for the session of the wireless device that are to be sent to an upstream radio node, such as a DU (e.g., DU 124). For instances in which a RAN is implemented in the mobile network that includes a gNB, the gNB can provide the second trace flag in a header of GTP encapsulations of the IP packets that are to be sent to an upstream UPF.

Upon identifying, by a particular network element of the mobile network, the second trace flag for encapsulations of the IP packets (e.g., GTP encapsulations received by CU 126 or DU 124 or eCPRI encapsulations received by RU 122 or DU 124) for the session wireless device, the method can include copying the second trace flag for incoming encapsulations of the IP packets and providing the second trace flag for outgoing encapsulations of the IP packets that are sent to another network element of the mobile network for the session of the wireless device. In the case of a DU, such as DU 124, the second trace flag can be identified for incoming eCPRI encapsulations of IP packets for an uplink data flow for the session of the wireless device that is received from an RU, such as RU 122, and be copied and provided for an outgoing GTP encapsulations of the IP packets that are to be sent to a CU, such as CU 126. The opposite operations can be performed for downlink GTP flows received from the DU that are to be sent to the CU via eCPRI encapsulations.

The mobile network (e.g., TMF or UPF) can generate the first trace flag that is unique to the session of the wireless device. In some embodiments, the second trace flag can be a copy of the first trace flag. In other embodiments, the second trace flag can be a hash of the first trace flag.

Although not shown in FIG. 4, the method may further include updating, by a particular network element of the mobile network, the trace database with underlay trace information for the underlay-level trace for the session of the wireless device upon sending or receiving encapsulations of the IP packets that include the second trace flag. Further, although not shown in FIG. 4, the method may further include providing the underlay trace information to the enterprise along with the correlation identifier in which the underlay trace information for the underlay-level trace is correlated to enterprise trace information for the enterprise-level trace using the correlation identifier.

Accordingly, embodiments herein provide for the ability to initiate a 5G underlay trace based on either metadata encoded within an enterprise-level trace (data plane) or based on signaling between a 5G SP and an enterprise customer (control plane), and then tie the two disparate traces together with a correlation identifier in order to provide a comprehensive end-to-end trace that can be useable and valuable to both parties.

Figure 5:
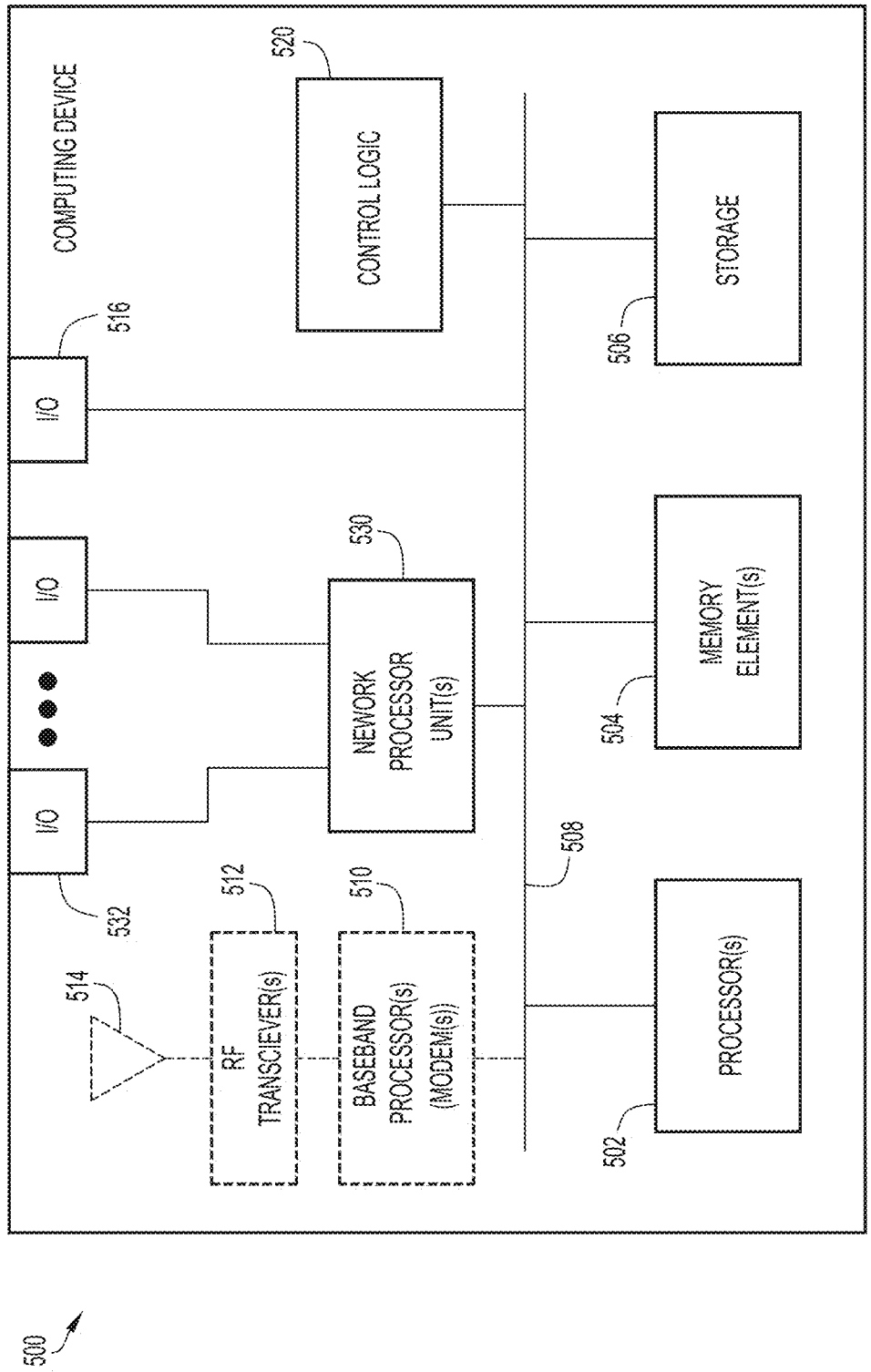
FIG. 5 is a hardware block diagram of a computing device that may perform functions associated with any combination of operations discussed in connection with techniques described for embodiments herein.

Referring to FIG. 5, FIG. 5 illustrates a hardware block diagram of a computing device 500 that may perform functions associated with operations discussed herein in connection with the techniques depicted in FIGS. 1A, 1B, 2A, 2B, 3, and 4. In various embodiments, a computing device or apparatus, such as computing device 500 or any combination of computing devices 500, may be configured as any entity/entities as discussed for the techniques depicted in connection with operations illustrated/discussed for various embodiments herein, such as, TMF 152, PCF 148, NEF 150, SMF 144, AMF 146, UPF 142, CU 126, DU 124, RU 122, wireless device 102, any gNB, and/or any other elements/functions/nodes discussed herein.

In at least one embodiment, the computing device 500 may be any apparatus that may include one or more processor(s) 502, one or more memory element(s) 504, storage 506, a bus 508, one or more network processor unit(s) 530 interconnected with one or more network input/output (I/O) interface(s) 532, one or more I/O interface(s) 516, and control logic 520. In various embodiments, instructions associated with logic for computing device 500 can overlap in any manner and are not limited to the specific allocation of instructions and/or operations described herein.

For embodiments in which computing device 500 may be implemented as any device capable of wireless communications (e.g., RU 122, a gNB, wireless device 102, etc.), computing device 500 may further include at least one baseband processor or modem 510, one or more radio RF transceiver(s) 512 (e.g., any combination of RF receiver(s) and RF transmitter(s)), one or more antenna(s) or antenna array(s) 514.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 530 may enable communication between computing device 500 and other systems, entities, etc., via network I/O interface(s) 532 (wired and/or wireless) to facilitate operations discussed for various embodiments described herein. In various embodiments, network processor unit(s) 530 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 532 can be configured as one or more Ethernet port(s), Fibre Channel ports, any other I/O port(s), and/or antenna(s)/antenna array(s) now known or hereafter developed. Thus, the network processor unit(s) 530 and/or network I/O interface(s) 532 may include suitable interfaces for receiving, transmitting, and/or otherwise communicating data and/or information (wired and/or wirelessly) in a network environment.

I/O interface(s) 516 allow for input and output of data and/or information with other entities that may be connected to computing device 500. For example, I/O interface(s) 516 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 500 is implemented as a wireless device or any apparatus capable of wireless communications, the RF transceiver(s) 512 may perform RF transmission and RF reception of wireless signals via antenna(s)/antenna array(s) 514, and the baseband processor or modem 510 performs baseband modulation and demodulation, etc. associated with such signals to enable wireless communications for computing device 500.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a mobile network, a trigger from an enterprise to initiate an underlay-level trace for a wireless device of the enterprise, wherein the trigger includes a correlation identifier that correlates the underlay-level trace with an enterprise-level trace for the wireless device; and providing, by the mobile network, the underlay-level trace for a session of the wireless device by including a first trace flag for Internet Protocol (IP) packets for the session of the wireless device and including a second trace flag for encapsulations of the IP packets for the session of the wireless device wherein the first trace flag and the second trace flag are unique to the session of the wireless device and are to enable network elements of the mobile network to provide underlay trace information for the underlay-level trace for the session of the wireless device to a trace database within the mobile network, wherein the underlay trace information is stored in the trace database in association with the correlation identifier and session identifying information for the session of the wireless device.

In one instance, the method may further include providing the underlay trace information to the enterprise along with the correlation identifier, wherein the underlay trace information for the underlay-level trace is correlated to enterprise trace information for the enterprise-level trace using the correlation identifier.

The method may further include, generating, by the mobile network, the first trace flag that is unique to the session of the wireless device. The second trace flag can be a copy of the first trace flag or the second trace flag can be a hash of the first trace flag.

The session identifying information for the session of the wireless device can include 5-tuple information including, a source IP address identifier, a destination IP address identifier, a source port identifier, a destination port identifier and a transport protocol identifier associated with the session of the wireless device.

In one instance of the method, for a downlink data flow of the session of the wireless device, the first trace flag is provided by a user plane function (UPF) of the mobile network for a header of the IP packets for the session of the wireless device and the second trace flag is provided by the UPF for a header of General Packet Radio Service (GPRS) Tunneling Protocol (GTP) tunnel encapsulations of the IP packets for the session of the wireless device.

In one instance of the method, for an uplink data flow of the session of the wireless device, the first trace flag is provided by one of the wireless device or a radio unit (RU) of the mobile network for a header of the IP packets for the session of the wireless device and the second trace flag is provided by the RU of the mobile network for a header of enhanced Common Public Radio Interface (eCPRI) encapsulations of the IP packets for the session of the wireless device.

In one instance, the method may further include upon identifying, by a particular network element of the mobile network, the second trace flag for encapsulations of the IP packets for the session wireless device, copying the second trace flag for incoming encapsulations of the IP packets and providing the second trace flag for outgoing encapsulations of the IP packets that are sent to another network element of the mobile network for the session of the wireless device.

In one instance, the method may further include updating, by a particular network element of the mobile network, the trace database with underlay trace information for the underlay-level trace for the session of the wireless device upon sending or receiving encapsulations of the IP packets that include the second trace flag.

In one instance, the trigger including the correlation identifier obtained from the enterprise to initiate the underlay-level trace for the session of the wireless device is obtained via control plane signaling from the enterprise by a trace manager function of the mobile network.

In one instance, the trigger including the correlation identifier obtained from the enterprise to initiate the underlay-level trace for the session of the wireless device is obtained via data plane signaling from the enterprise by a user plane function (UPF) of the mobile network that is facilitating the session of the wireless device.

Accordingly, embodiments herein provide for the ability to initiate a 5G underlay trace based on either metadata encoded within an enterprise-level trace (data plane) or based on signaling between a 5G SP and an enterprise customer (control plane), and then tie the two disparate traces together with a correlation identifier in order to provide a comprehensive end-to-end trace that can be useable and valuable to both parties.

When the 5G core (e.g., core network 140) determines to initiate an underlay-level trace, embodiments herein can provide for the ability to signal to the UE to write a special trace flag into the packet header of IP packets and encapsulations of the IP packets. The flag, which can be considered a first trace flag included in the header of IP packets and a second trace flag included in the header of encapsulations of the IP packets will be written when an underlay-level trace is initiated for the 5G core. The trace flag (value, string, etc.) is generated by the 5G core and instructions can be given to a specific wireless device having the PDU session that is to be traced to use this flag or instructions can be given to an RU handling the PDU session to include the trace flag(s) in the headers of IP packets and the headers of encapsulations of the IP packets. Other embodiments herein may provide for the ability of the 5G core to signal to the RU to copy the special trace flag from an inner IP packet header (if inserted by the wireless device) to the outer eCPRI packet header for upstream/uplink direction data flows. This can be performed on a per-flag basis based on the underlay-level trace being kicked off, otherwise any such flag(s) carried in packets can be ignored by the RU.

Embodiments herein may also provide for the ability to instruct a UPF handling the PDU session of the wireless device to write the special trace flag(s) into downstream flows on both the inner IP packets, as well as the GTP tunnel header, for the specific PDU session of the wireless device.

Further, embodiments, herein may also provide for the ability for the 5G core to signal to the DU to copy the trace flag in the upstream eCPRI header to a GTP header, and visa-versa. Further, embodiments herein may also provide for the ability for the 5G core to signal to the CU to copy the trace flag in the GTP header from the DU to the GTP header in the DU, and vice versa.

Further, embodiments herein may provide for the ability to write the trace flag (e.g., the second trace flag carried via encapsulations of IP packets for the PDU session of the wireless device) to a database (e.g., trace database 154) that is accessible by any networking device in the underlay. Further, embodiments herein may provide for the ability of any underlay networking device to access this database and trace the path and performance of the flow based on the (second) trace flag that is being carried on either the eCPRI or the GTP headers. Further, embodiments herein may provide for the ability of any underlay networking device to report back to the 5G packet core/database regarding telemetry metrics for the underlay-level trace for the PDU session of the wireless device as such network devices observe the (second) trace flag in tunneled/encapsulated flows.

Thus, embodiments herein may broadly provide for the ability of a 5G core to initiate a trace flag in a wireless device for a corresponding PDU session for which underlay-level tracing has been initiated by an enterprise associated with the wireless device, or to initiate trace flag(s) in a capable device somewhere in the FH/MH/BH networks close to the wireless device in the uplink direction, and impose the flag(s) directly in the downlink direction from the 5G core. To ensure a trace flag is preserved for the underlay to see and take record of the flag, the trace flag can be exposed to the outer 5G tunnel/encapsulation headers (in the form of a 'second' trace flag') as the packet passes along the whole length of the PDU session. Thus, the 5G core can communicate with the CU to ensure the flag is correctly copied from the GTP tunnel headers on both sides of the CU. Furthermore, the core can communicate with the DU to ensure the flag is correctly maintained from the eCPRI to the GTP tunnel header, and visa-versa. The purpose of such signaling/instruction is to ensure that end-to-end visibility of a flag that is visible to the underlay is provided in order to track the PDU session path.

As for how the RU translates the flag coming from a wireless device, the RU can, in some embodiments, be instructed by the 5G Core to look for an incoming trace flag on the PDU packet header (this could be various types of flags, from an IPv6 extension header to some other metadata) and the RU can simply be instructed to copy this field to the eCPRI header so the underlay has visibility of the trace flag. The DU can then copy the trace flag between the eCPRI and GTP headers, and the CU can copy the trace flag from GTP to GTP header so visibility is maintained on the outer headers for the underlay to track it for the PDU session of the wireless device.

The FH/MH/BH devices (e.g., RU, DU, CU) are simply asked to copy the existing flag from one header to another. As for how a wireless device could write such a trace flag into headers of IP packets for an uplink data flow of a PDU session, various embodiments are envisioned. In one embodiment, such inclusion of a trace flag in packets of an uplink data flow could be provided via 3GPP standards. However, in another embodiment, proprietary logic could be implemented for enterprise-controlled wireless devices (e.g., provided by the enterprise entity operating/managing the wireless devices) in order to facilitate operations by the wireless devices to include a trace flag in packets of an uplink flow for which underlay-level tracing has been initiated. For example, an enterprise entity may enable 5G service for a host of industrial IoT endpoints and may have long established relationships with industrial IoT vendors that can implement such proprietary logic for the enterprise in the industrial IoT devices. As a result, realization of embodiments herein can occur with or without standardization as vendor-specific implementations can be agreed between interested parties.

In yet other embodiments as discussed herein, if a wireless device doesn't support this functionality, the nearest IP hop in the FH network, such as an RU, could have a trace orchestrated from the 5G Core telling the nearest (uplink) IP hop to impose the tracing flag for uplink packets received for a PDU session of a wireless device that matches a certain identity/session identifying information, thus slightly truncating the trace of the PDU session path but still providing critical tracing flag visibility to the underlay for the remainder of the PDU session path.

As discussed for various embodiments herein, the outer (second) trace flag that can be provided for encapsulations of IP packets can be provided using any appropriate header field. For example, in the eCPRI header, any of Message Types 64-255 could be used to carry the outer (second) trace flag. In the case of GTP, a GTP extension header that would allow a flag of this type could be utilized to carry the outer (second) trace flag.

Thus, embodiments herein advantageously provide novelty through the ability to create a linkage between the path that a PDU session traverses through a mobile network and the physical underlay that is used to transport the PDU session. Such linkage can be provided by creating or generating at least one tracing flag (e.g., generating one first flag if the second flag is to be a copy of the first flag or generating one first flag and then potentially generating a second flag that is a hash of the first flag in some embodiments) that can be initiated by the 5G Core for use in either a wireless device, a network element of the core network itself, a network element of a vRAN, or another entity. The outer (second) flag that is to track the path of encapsulations of IP packets of the PDU session can also be published to a trace database. The underlay network devices look for the outer (second) flag and make a record of it when it is observed, thereby allowing network/device management for an enterprise-controlled wireless device to correlate both path and performance of the underlay and overlay aspects of a (5G/nG) mobile network.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and' one or more of can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, by a mobile network, a trigger from an enterprise to initiate an underlay-level trace for a wireless device of the enterprise, wherein the trigger includes a correlation identifier that correlates the underlay-level trace with an enterprise-level trace for the wireless device; and
providing, by the mobile network, the underlay-level trace for a session of the wireless device that involves a data flow for communications traversing the mobile network between the wireless device and an enterprise service of the enterprise by including a first trace flag in Internet Protocol (IP) packets of the data flow for the session of the wireless device via a user plane function (UPF) of the mobile network for a downlink direction of the data flow for the session and via one of the wireless device or a radio unit (RU) of the mobile network for an uplink direction of the data flow for the session and by including a second trace flag in encapsulations of the IP packets of the data flow for the session of the wireless device via the UPF of the mobile network for the downlink direction of the data flow for the session and via the RU of the mobile network for the uplink direction of the data flow for the session, wherein the first trace flag and the second trace flag are unique to the session of the wireless device and are to enable network elements of the mobile network to provide underlay trace information for the underlay-level trace for the session of the wireless device to a trace database within the mobile network, wherein the underlay trace information is stored in the trace database in association with the correlation identifier and session identifying information for the session of the wireless device.

2. The method of claim 1, further comprising:
providing the underlay trace information to the enterprise along with the correlation identifier, wherein the underlay trace information for the underlay-level trace is correlated to enterprise trace information for the enterprise-level trace using the correlation identifier.

3. The method of claim 1, further comprising:
generating, by the mobile network, the first trace flag that is unique to the session of the wireless device.

4. The method of claim 3, wherein one of:
the second trace flag is a copy of the first trace flag; or
the second trace flag is a hash of the first trace flag.

5. The method of claim 1, wherein the session identifying information for the session of the wireless device comprises 5-tuple information including, a source IP address identifier, a destination IP address identifier, a source port identifier, a destination port identifier and a transport protocol identifier associated with the session of the wireless device.

6. The method of claim 1, wherein for the downlink direction of the data flow for the session of the wireless device, the first trace flag is included by the UPF of the mobile network in a header of the IP packets of the data flow for the session of the wireless device and the second trace flag is included by the UPF in a header of General Packet Radio Service (GPRS) Tunneling Protocol (GTP) tunnel encapsulations of the IP packets of the data flow for the session of the wireless device.

7. The method of claim 1, wherein for the uplink direction of the data flow for the session of the wireless device, the first trace flag is included by one of the wireless device or the RU of the mobile network for a header of the IP packets of the data flow for the session of the wireless device and the second trace flag is provided by the RU of the mobile network for a header of enhanced Common Public Radio Interface (eCPRI) encapsulations of the IP packets for the session of the wireless device.

8. The method of claim 1, further comprising:
upon identifying, by a particular network element of the mobile network, the second trace flag for encapsulations of the IP packets of the data flow for the session of the wireless device, copying the second trace flag for incoming encapsulations of the IP packets of the data flow and providing the second trace flag for outgoing encapsulations of the IP packets for the data flow that are sent to another network element of the mobile network for the session of the wireless device.

9. The method of claim 1, further comprising:
updating, by a particular network element of the mobile network, the trace database with underlay trace information for the underlay-level trace for the session of the wireless device upon sending or receiving encapsulations of the IP packets of the data flow for the session of the wireless device that include the second trace flag.

10. The method of claim 1, wherein the trigger including the correlation identifier obtained from the enterprise to initiate the underlay-level trace for the session of the wireless device is obtained via control plane signaling from the enterprise by a trace manager function of the mobile network.

11. The method of claim 1, wherein the trigger including the correlation identifier obtained from the enterprise to initiate the underlay-level trace for the session of the wireless device is obtained via data plane signaling from the enterprise by the UPF of the mobile network that is facilitating the session of the wireless device in which the UPF initiates the underlay-level trace for the session of the wireless device based on the trigger.

12. The method of claim 1, further comprising:
updating, by at least one of a fronthaul network, a midhaul network, or a backhaul network, the trace database with underlay trace information for the underlay-level trace for the session of the wireless device upon sending or receiving encapsulations of the IP packets of the data flow for the session of the wireless device that include the second trace flag.

13. A plurality of non-transitory computer readable storage media encoded with instructions that, when executed by a plurality of processors, cause the plurality of processors to perform operations, comprising:
obtaining, by a mobile network, a trigger from an enterprise to initiate an underlay-level trace for a wireless device of the enterprise, wherein the trigger includes a correlation identifier that correlates the underlay-level trace with an enterprise-level trace for the wireless device; and
providing, by the mobile network, the underlay-level trace for a session of the wireless device that involves a data flow for communications traversing the mobile network between the wireless device and an enterprise service of the enterprise by including a first trace flag in Internet Protocol (IP) packets of the data flow for the session of the wireless device via a user plane function (UPF) of the mobile network for a downlink direction of the data flow for the session and via one of the wireless device or a radio unit (RU) of the mobile network for an uplink direction of the data flow for the session and by including a second trace flag in encapsulations of the IP packets of the data flow for the session of the wireless device via the UPF of the mobile network for the downlink direction of the data flow for the session and via the RU of the mobile network for the uplink direction of the data flow for the session, wherein the first trace flag and the second trace flag are unique to the session of the wireless device and are to enable network elements of the mobile network to provide underlay trace information for the underlay-level trace for the session of the wireless device to a trace database within the mobile network, wherein the underlay trace information is stored in the trace database in association with the correlation identifier and session identifying information for the session of the wireless device.

14. The media of claim 13, the operations further comprising:
providing the underlay trace information to the enterprise along with the correlation identifier, wherein the underlay trace information for the underlay-level trace is correlated to enterprise trace information for the enterprise-level trace using the correlation identifier.

15. The media of claim 13, wherein the trigger including the correlation identifier obtained from the enterprise to initiate the underlay-level trace for the session of the wireless device is obtained via control plane signaling from the enterprise by a trace manager function of the mobile network.

16. A system comprising:
at least one memory element for storing data; and
at least one processor for executing instructions associated with the data, wherein executing the instructions causes the system to perform operations, comprising:
obtaining, by a mobile network, a trigger from an enterprise to initiate an underlay-level trace for a wireless device of the enterprise, wherein the trigger includes a correlation identifier that correlates the underlay-level trace with an enterprise-level trace for the wireless device; and
providing, by the mobile network, the underlay-level trace for a session of the wireless device that involves a data flow for communications traversing the mobile network between the wireless device and an enterprise service of the enterprise by including a first trace flag in Internet Protocol (IP) packets of the data flow for the session of the wireless device via a user plane function (UPF) of the mobile network for a downlink direction of the data flow for the session and via one of the wireless device or a radio unit (RU) of the mobile network for an uplink direction of the data flow for the session and by including a second trace flag in encapsulations of the IP packets of the data flow for the session of the wireless device via the UPF of the mobile network for the downlink direction of the data flow for the session and via the RU of the mobile network for the uplink direction of the data flow for the session, wherein the first trace flag and the second trace flag are unique to the session of the wireless device and are to enable network elements of the mobile network to provide underlay trace information for the underlay-level trace for the session of the wireless device to a trace database within the mobile network, wherein the underlay trace information is stored in the trace database in association with the correlation identifier and session identifying information for the session of the wireless device.

17. The system of claim 16, wherein executing the instructions causes the system to perform further operations, comprising:
providing the underlay trace information to the enterprise along with the correlation identifier, wherein the underlay trace information for the underlay-level trace is correlated to enterprise trace information for the enterprise-level trace using the correlation identifier.

18. The system of claim 16, wherein the trigger including the correlation identifier obtained from the enterprise to initiate the underlay-level trace for the session of the wireless device is obtained via control plane signaling from the enterprise by a trace manager function of the mobile network.

19. The system of claim 16, wherein the trigger including the correlation identifier obtained from the enterprise to initiate the underlay-level trace for the session of the wireless device is obtained via data plane signaling from the enterprise by the UPF of the mobile network that is facilitating the session of the wireless device in which the UPF initiates the underlay-level trace for the session of the wireless device based on the trigger.

20. The system of claim 16, wherein executing the instructions causes the system to perform further operations, comprising:
updating, by a particular network element of the mobile network, the trace database with underlay trace information for the underlay-level trace for the session of the wireless device upon sending or receiving encapsulations of the IP packets that include the second trace flag.

\* \* \* \* \*